April 2, 1940.     E. A. THOMPSON     2,195,605
CHANGE-SPEED TRANSMISSION AND CONTROL
Filed Oct. 8, 1934     9 Sheets-Sheet 5

Inventor
Earl A. Thompson
By Blackmore, Spencer & Flint
Attorneys

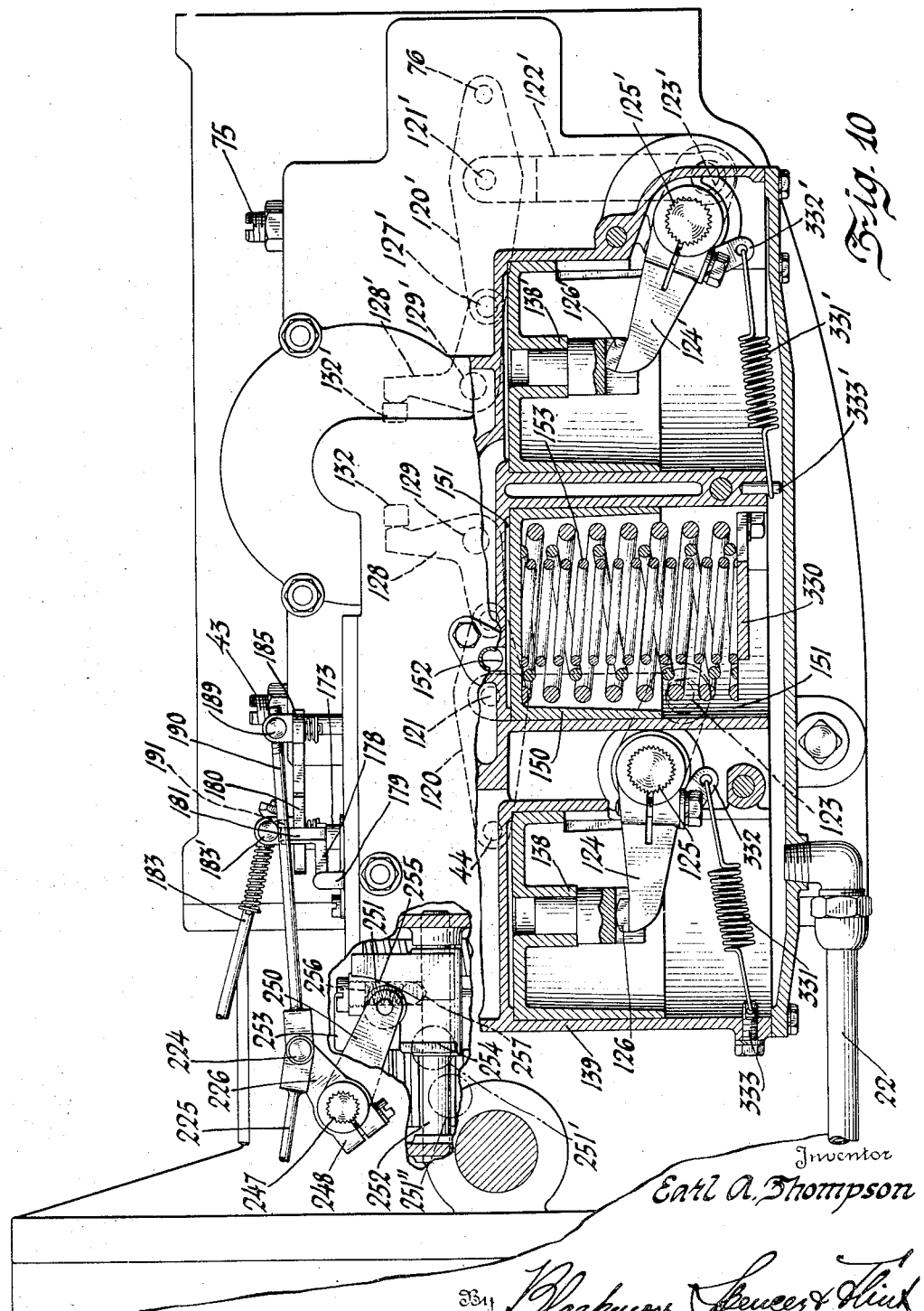

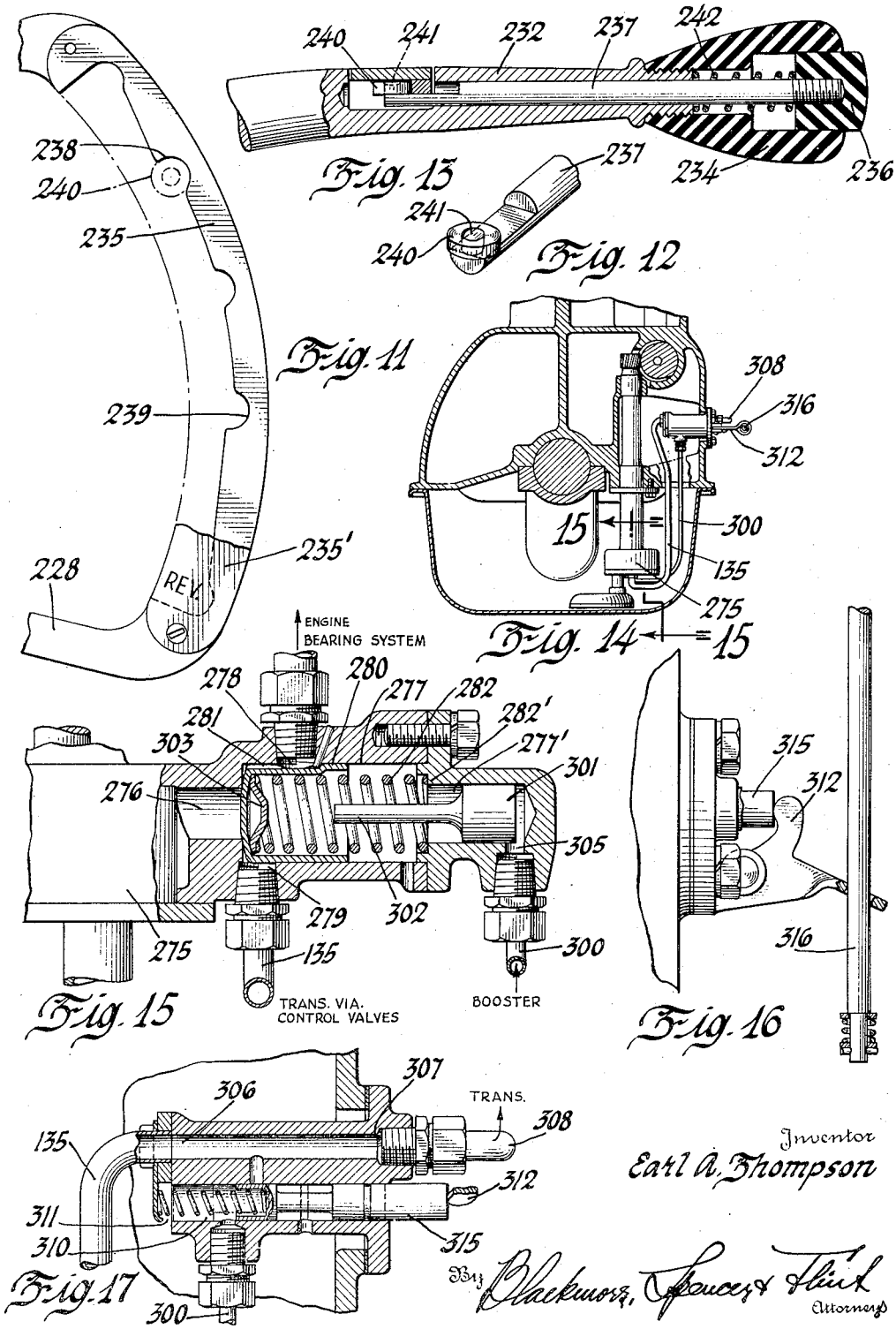

April 2, 1940.  E. A. THOMPSON  2,195,605
CHANGE-SPEED TRANSMISSION AND CONTROL
Filed Oct. 8, 1934  9 Sheets-Sheet 9

Inventor
Earl A. Thompson
By Blackmore, Jones & Flint
Attorneys

Patented Apr. 2, 1940

2,195,605

UNITED STATES PATENT OFFICE 2,195,605

CHANGE-SPEED TRANSMISSION AND CONTROL

Earl A. Thompson, Birmingham, Mich., assignor to General Motors Corporation, Detroit, Mich., a corporation of Delaware Application October 8, 1934, Serial No. 747,386

60 Claims. (Cl. 74—262)

This invention relates to the combination of variable speed mechanisms with power plants and the interconnecting of the control mechanisms for such transmission and power units, whereby both automatic and manual selection of speed ratio are readily available to the operator.

More specifically, an embodiment of my invention to be hereinafter described is shown as applied to the automotive vehicle, in which embodiment three distinct transmission units are described; one providing forward, reverse or neutral drive; another yielding automatic selection and the third manual selection of speed ratio. In the arrangement shown, the units are in the order given between the power plant and the final drive, the combination providing four speeds forward and reverse speeds of equivalent number if desired, all subject to dependable control means requiring minimum effort and possessing positively acting characteristics, the net objective being to establish a higher degree of dominance by the operator over the ratio selection means than heretofore afforded in such mechanism, whereby increased safety in the handling of automotive vehicles equipped with my device, may be achieved.

The principal object of my invention is the provision of a power transmission device having the above characteristics, in which certain novel features yield positive manually selected speed ratios, while affording automatic speed ratio selection, at the will of the car driver, and in which unique combinations of governor and manual operation provide against overstressing essential working parts of the mechanism.

A main objective of my invention is to provide a change-speed transmission control means in which the variable factors of speed response and will of the car operator are combined, and over which the operator may exercise independent mastery, which latter can be exerted at any time without loss of the benefits achieved from the automatic devices used, while constantly maintaining the safety factor guaranteed by the overcoming manual control.

An important object is the creation of automatic interacting control means which combine governor response with car driver will so that the selection of driving speed ratio is the integrated result of driver will or intention, and the ability of the engine and driving mechanism to perform that will. This feature is accomplished by a novel arrangement of correlated elements which being reciprocally movable with respect to each other produce through their relative positioning, a derived variable control effect on speed ratio change.

A principal purpose of my invention is the provision of a change-speed mechanism of unique, smooth operating characteristics. This I accomplish in part, by arranging that during ratio shift when torque is momentarily interrupted and non-synchronous speeds exist, the control and driving forces present are together operating to diminish the elapsed time of shift, due to incorporated means which tend to synchronize the torque-carrying elements.

One feature of my device is the use of self-synchronization speed means in combination with transmission elements, of which one is a rotatable reaction member. An unique result of my invention is the achievement of such synchronization between a reaction member and its non-rotating frame at an instant when the relative speeds of driving and driven elements are proportional to the speed ratio at which the mechanism drives when the reaction member is stopped.

A further object is the associating of transmission elements in a particular manner by which special results in structural strength, compactness of design, ease of control and economy in manufacture are achieved, as described in the following specifications.

Of especial interest is my unique arrangement of speed ratio determining mechanism whereby alternating means for engaging selected transmission speed ratios are made interacting to the extent that they not only function positively in alternation, but also interact to eliminate the need for constant adjustment, which need is a characteristic common in known alternating speed ratio determining devices in the prior art.

It is an object of my invention to provide special control means whereby the car driver may at will shift transmission speed ratio as for example, when descending a steep grade and thereby use the car engine as a brake; and whereby the same control may be utilized for emergency acceleration in order to drive the vehicle rapidly away from an impending dangerous traffic situation.

A further purpose is to provide inherent protection against abuse of the mechanism, which purpose is in part fulfilled by means connected with a governor active at above certain vehicle speeds to inhibit a shift of speed ratio from direct drive to some geared driving speed.

Additional advantageous features and objects of my invention will become apparent during the description in the following specifications in conjunction with the accompanying drawings.

Figure 1(a) is a plan view of the operator control mechanism as seen from the driver's position adjacent the steering wheel.

Figure 1(b) is an enlarged view of the manual selector controls and levers adjacent the car driver as shown in Fig. 1.

Figure 1(c) is a similar enlarged view of the control elements connected to the accelerator pedal.

Figure 10 is a side view of the control apparatus as in Figure 1, with the speed ratio actuating elements partly in section. The engine lies to the left as in Figure 1.

Figure 11 shows the detail of the hand control sector as attached to the steering column in Figures 1 and 1(a).

Figure 12 is a perspective view of the ratchet latch which engages the notches of the sector of Figure 11.

Figure 13 is a section of the speed ratio hand control lever which co-operates with the sector of Figure 11.

Figure 14 is a schematic arrangement of the engine lubricating pump and servo pressure control system as installed in the engine crankcase assembly.

Figure 15 shows the servo pressure control valving in section adjacent the engine lubricating pump, including the pressure booster cylinder and external connecting pressure lines, schematically outlined in Figure 14. The section is taken approximately at line 15—15 of Fig. 14.

Figure 16 provides the plan detail of external control for the booster shown in elevation in Figure 14 and in section in Figure 17.

Figure 17 describes the booster valve of Figure 14 in section elevation, shown also partially in plan in Figure 17. The external view of these elements is given in Figure 1.

Figure 2:
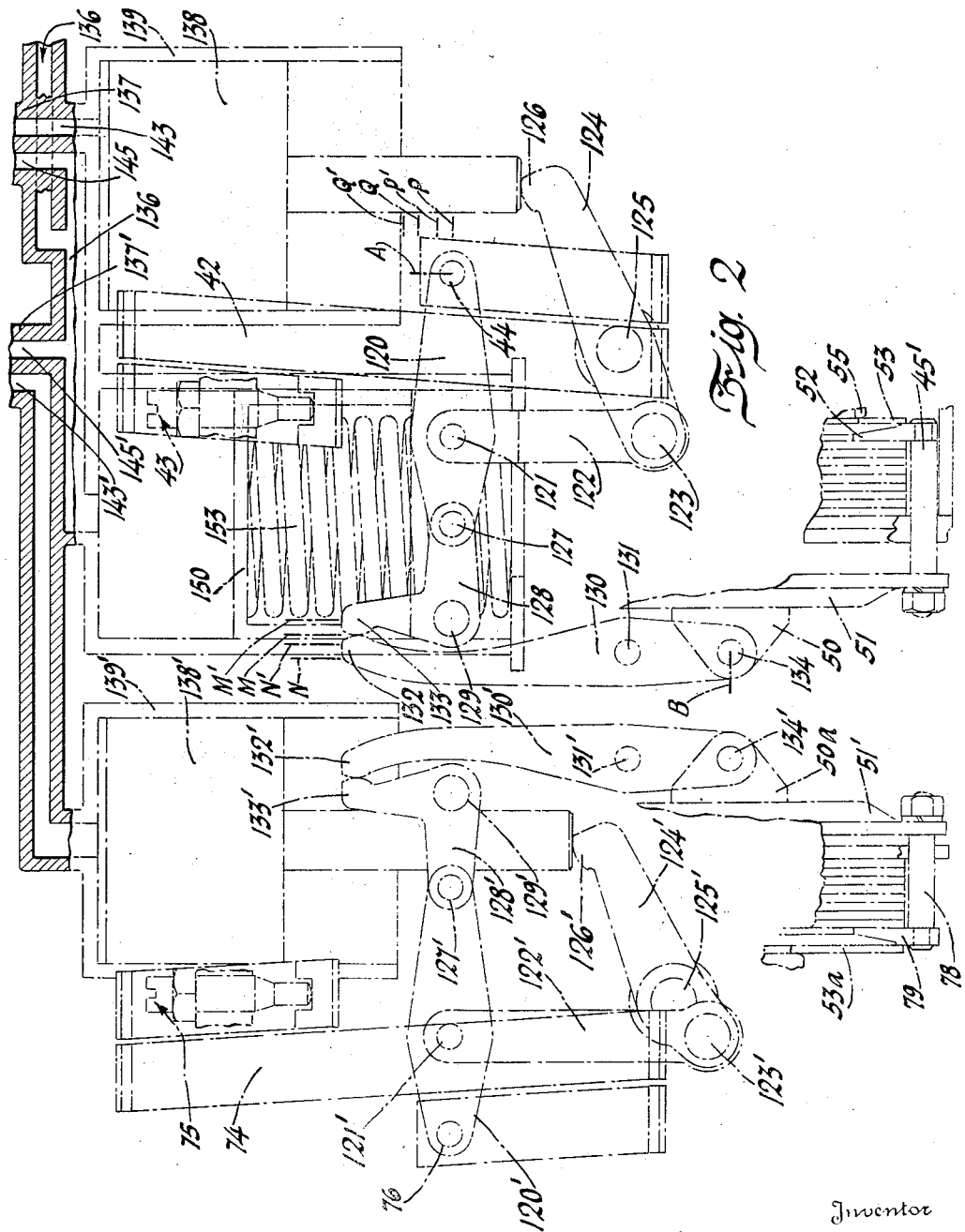
Figure 2 is a side elevation schematic view in dot-and-dash line of the actuating mechanism for changing of speed of both the automatic and manual units. This figure corresponds to that of Fig. 18 to be described later.
Figure 3:
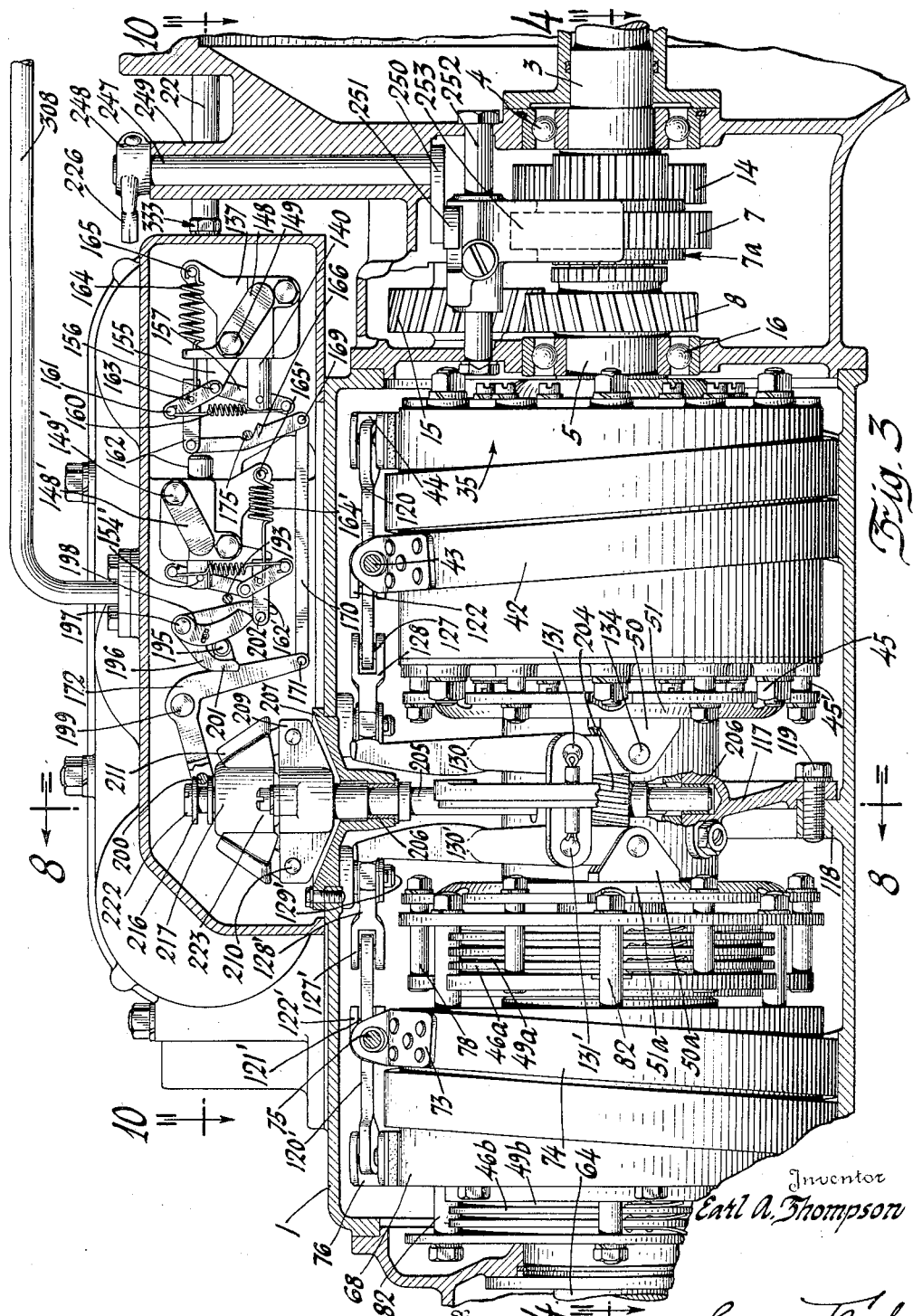
Figure 3 is a transverse plan view of the transmission casing as if the upper half had been removed so as to disclose the control mechanism mounted on the casing. The engine connected portions of the mechanism lie to the right of this figure.
Figures 18, 19:
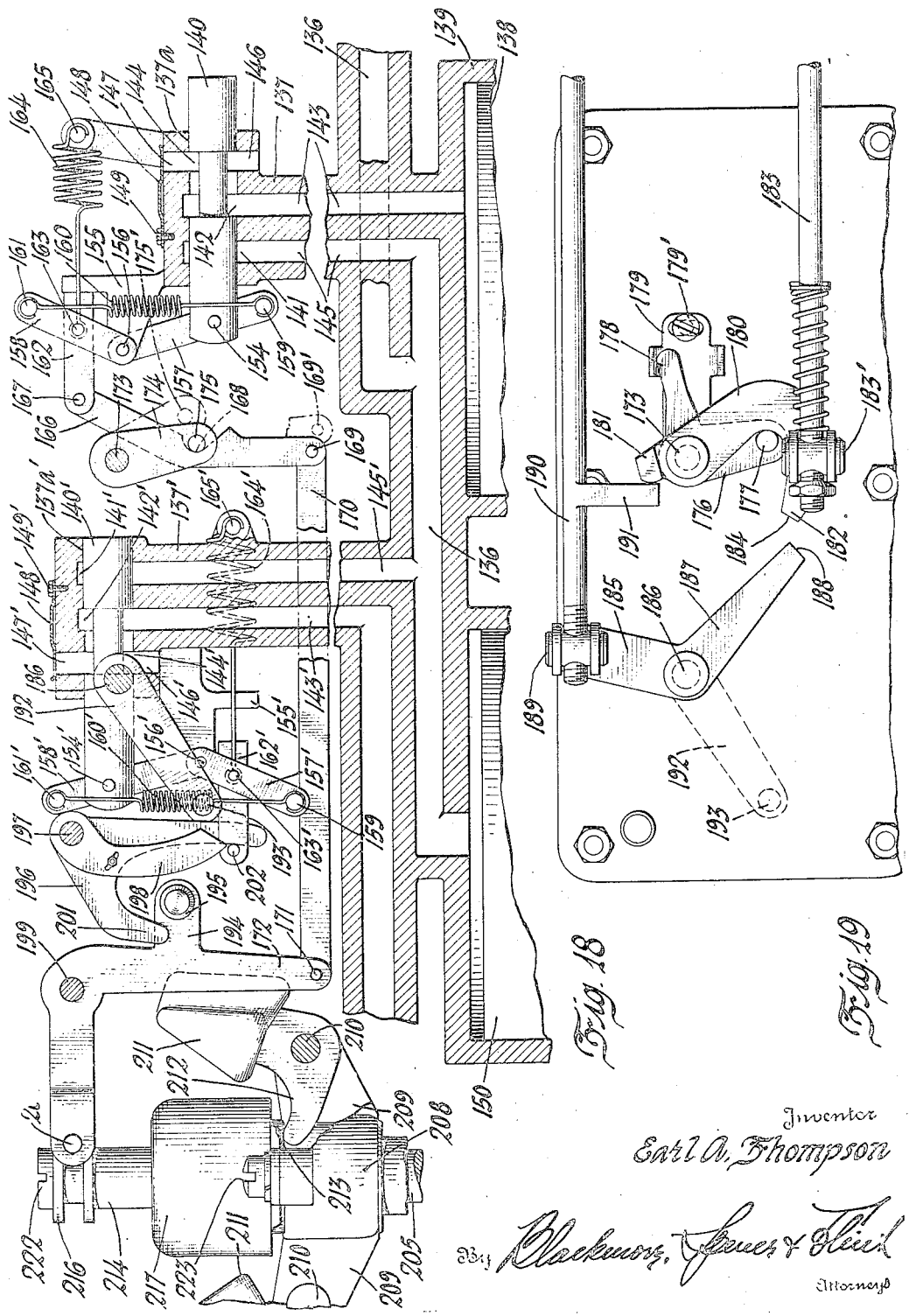

Figure 18 is a schematic plan view of the master control system embracing the speed responsive governor, the control valving and connecting lever system, with porting to the elements of speed ratio actuation, as shown in Figures 2 and 3, wherein the engine is shown to the right.

Figure 1:
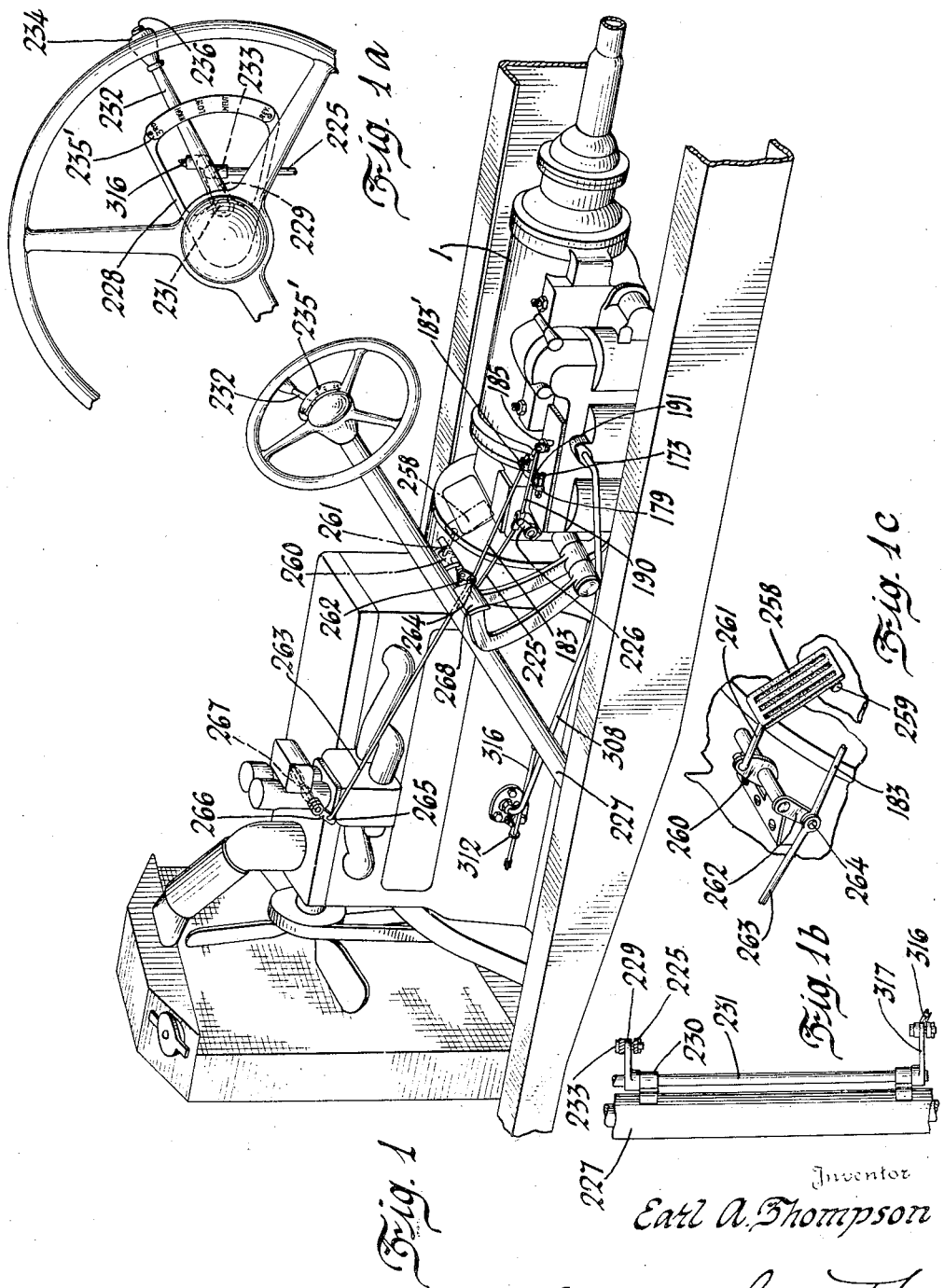
Figure 1 is a schematic view of an automobile chassis and power plant equipped with my invention, as viewed from the left side of the chassis.

Figure 19 is a plan view of the external control elements to the speed ratio shifting system as shown in side elevation in Figure 10 and perspective in Figure 1.

Figure 4:
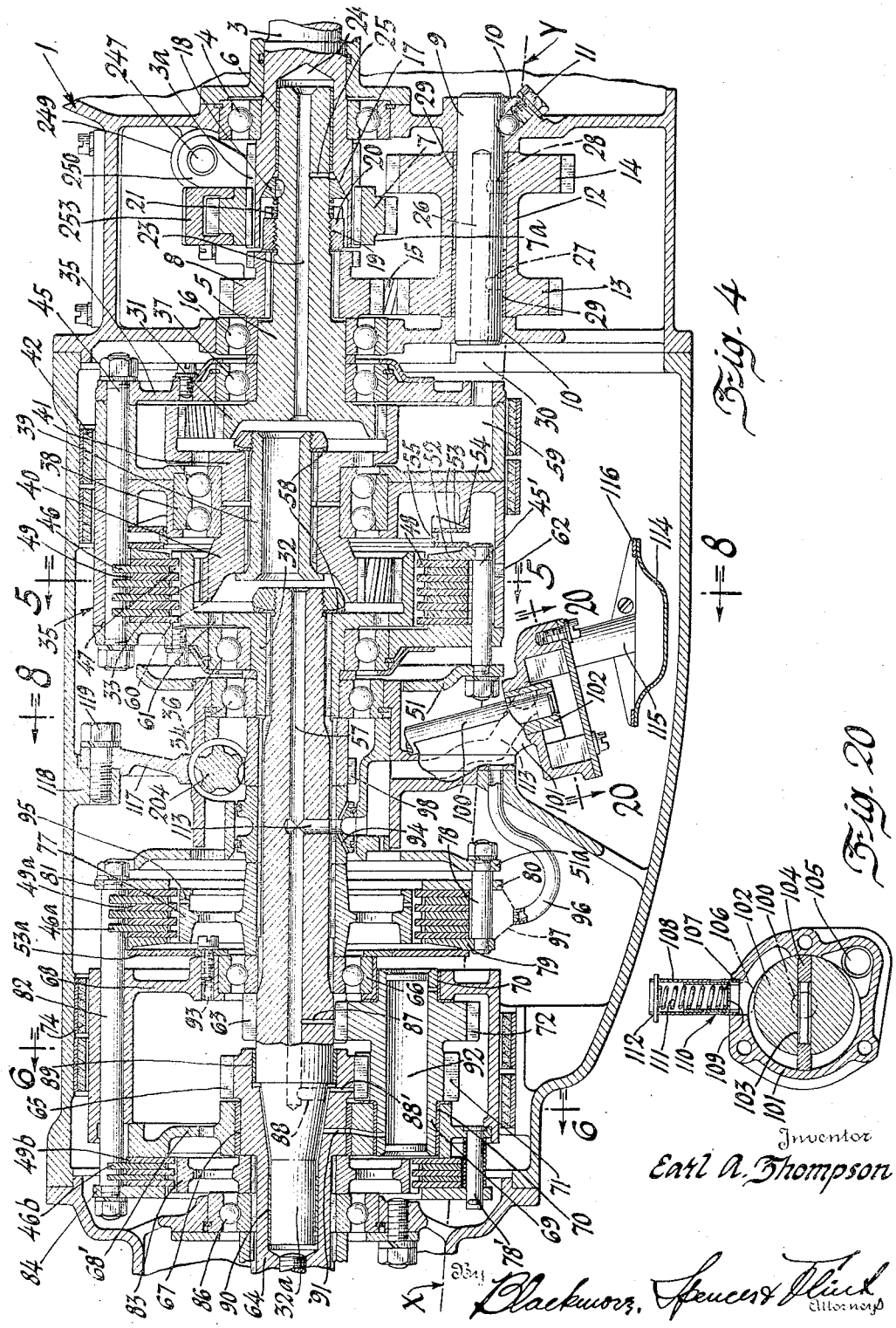
Figure 4 is a vertical section taken longitudinally through the transmission at the vertical central plane, with the engine connected portions lying to the right as in Figure 3.
Figure 8:
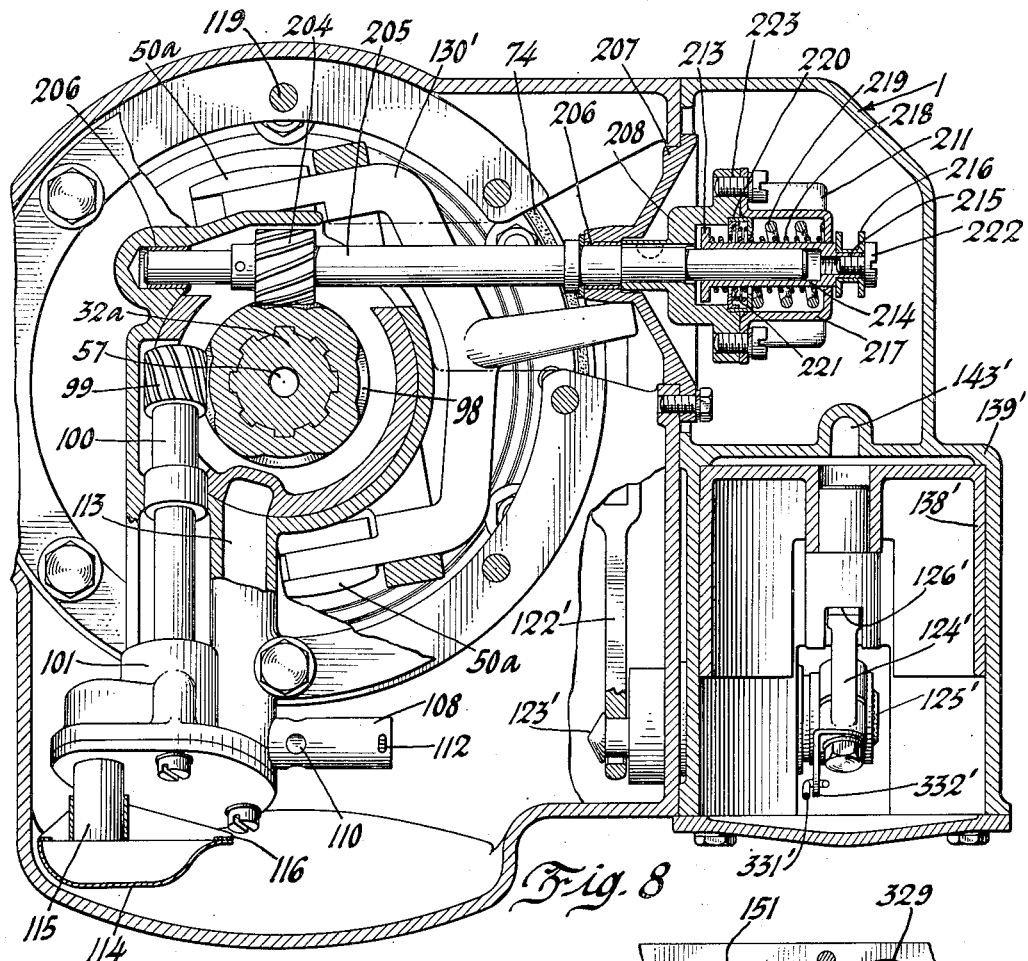
Figure 8 is a view of the transmission elements in the direction of the arrows at 8—8 in both of Figures 3 and 4.

Figure 20 on Sheet 4 is a sectional view on line 20—20 of Figure 4 of the transmission lubrication pump shown in elevation in Figures 4 and 8.

Figure 21:
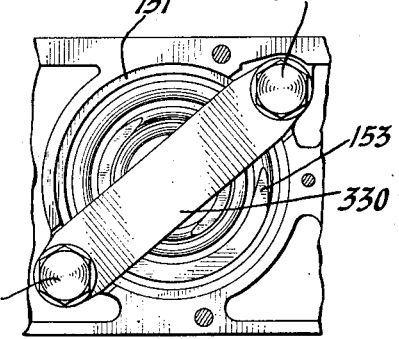

Figure 21, on Sheet 6 is a diagram of the thrust forces developed within the gearing of the automatic unit shown in section in Figure 4.

Referring to Figure 4 the assembly of power transmission units will be found to constitute three in number and placed in the line of power between the engine, located at the right in the drawing, and the load shaft or final drive located at the left.

*The reversing gear unit*

The first transmission unit in sequence from the engine is the reversing gear as shown in Figures 3 and 4. The primary or input shaft 3 is a continuation of the main clutch driven shaft or operatively coupled thereto. The shaft 3 is supported in bearings 4 and in the casing 1 and also pilots the end of the output shaft 5 with bearings 6.

The shaft 3 on an enlarged section is splined and its splines 3a mesh with internal spline teeth cut in gear 7, which is slidable longitudinally.

Gear 8 is splined on shaft 5 without axial motion, and has jaw teeth cut to mesh with similar teeth on the approaching face of gear 7. Both gears 7 and 8 are mounted concentrically with respect to the centerline of the input and output shafts.

Mounted parallel to the main shaft centerline is countershaft 9 firmly supported in casing 1 by means of seats 10 and lock-screw 11. Countershaft gear body 12 rotatably carries gears 13 and 14. A fixed shaft, not shown carries reverse idler gear 15 which is constantly meshed with gears 13 and 8. Gear 7 may also be moved to the right as in Figure 4 and meshed with gear 14. When gear 7 is clutched to gear 8, the gear unit transmits direct drive from shaft 3 to shaft 5; when gear 7 is meshed with gear 14 the gear unit transmits reverse drive from shaft 3 to shaft 5.

Bearing 16 supports shaft 5 in a web of the casing 1.

The open end of shaft 3 is recessed within the splines 3a and a smooth tapered face is cut at 17 in the recess. Cone 18 is slotted internally to slide axially over keys set in the forward extension of shaft 5, and light spring 21 fitted over that extension abuts threaded collar 20 and presses against cone 18. The light friction drag of 17—18 is utilized to facilitate shift by assisting in the absorption of inertia of the clutch driven shaft 3 when the element 7 is moved to select forward or reverse. Drilled passage 23 feeds lubricant thru hole 25 to the friction faces 17—18.

The gear 7 may be moved to the left into clutching engagement with gear 8, or it may occupy a non-meshing position. The motion of gear 7 may be continued to the right so as to mesh with gear 14.

The reversing gear unit described thus far is lubricated by three distinct means. The first means is drilled passage 23 through which oil is pumped as will be described later. This flow fills the pilot space 24 and flows through pilot bearing 6 and also through side drilled passage 25, whence it flows into the open end of recess cut in shaft 3 and passes out between the sides of gears 8 and 7, flowing from there into the sump, at the lower side of the transmission.

Attention is called to the novel arrangement in Figure 4 of re-entrant cone 17 of shaft 3, sliding cone 18, spring 21, lubricant main 23, and side port 25, which feeds pressure lubricant to the synchronizer faces. Under high pressures, cone 18 tends to be lifted clear of 17, while spring 21 may yield, permitting differential rotation forward or reverse, without drag, while pressure in main 23 is maintained by rotation of 32a and the connected pump to be described later. When a forward or reverse shift of gear 7 is made, the rotational speed of shaft 32a is low, and cone 18 may bear against 17 with full pressure of spring 21 since the pump and main pressure is then low, in accordance with shaft speed.

The faces of the gears in this unit are oiled by the dip of gears 13—14 into the sump oil whose approximate normal level is indicated by dashed line X—Y.

Countershaft 9 is hollow drilled at 26 and has side cut passages at 27 and 28 to feed oil to the bearings 29 of countershaft gear body 12 on shaft 9. Oil may flow from space 30 into drilled passage 26. The sump of the reversing gear unit is cross connected for oil flow with the main sump to be described later.

The automatic unit

The second transmission unit in line will hereafter be called the automatic unit for reasons which will hereinafter appear.

The input power shaft of the automatic unit is shaft 5, the output power shaft of the reversing gear unit.

On the left end of shaft 5 as shown in Figure 4 is affixed an externally toothed gear 31, which may be splined on, keyed to or integral with the shaft.

The output shaft 32 of the automatic unit similarly has internally toothed gear 33 affixed to it. Shaft 32 is supported in bearing 34 mounted in a bolted web 117 of casing 1, on shaft 32a.

A carrier member 35 is concentrically and rotatably mounted with respect to shafts 5 and 32 and supported in bearing 36 on shaft 32, and in bearing 37 on shaft 5. Supported in the body of the carrier 35 is the outer portion of eccentric bearing assembly 38. The inner portion of the eccentric bearing is fixed to splined tubular piece 39 having gear bodies 40—41 at either end. The tubular piece 39 is parallel to the center-line of shafts 32-5. On the left end of the tubular piece 39 is affixed gear-body 40 toothed externally and meshing with internal gear 33. On the right end of the tubular piece 39 is affixed gearbody 41, internally toothed and meshing with gear 31.

The tubular piece 39 then acts as an offset countershaft for the drive between shafts 5 and 32, and since it is rotatably mounted in carrier 35 through eccentric bearing 38, the carrier body may be prevented from rotation by braking means to provide one speed ratio, or it may be coupled to rotate with the main shafts 32—5 for direct drive.

Figure 6:
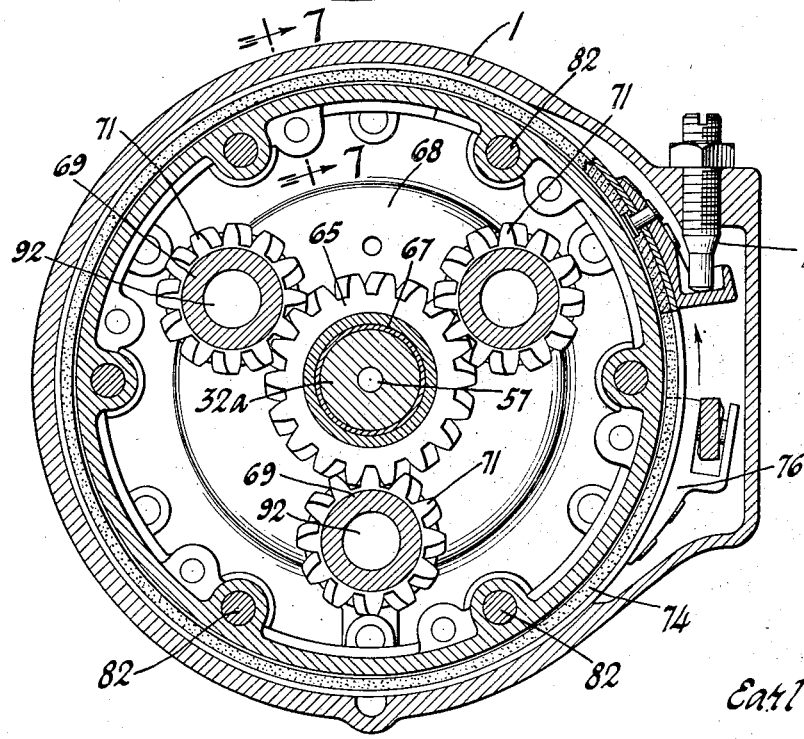
Figure 6 is a transverse vertical section substantially at 6—6 of Figure 4.

The braking means consists of a wrapping band 42 shown in Figures 3 and 4, supported in the casing at 43 and having its free end at 44 movable by appropriate linkage to be described later. The braking means may be continuous as shown in Figures 3 and 6 or it may be formed of discontinuous shoes or friction elements. The braking means encircles carrier 35, the outer surface of which is finished to form a smooth drumlike friction area for the inner faces of the braking means. The material backing of the braking means is preferably somewhat elastic.

Figure 5:
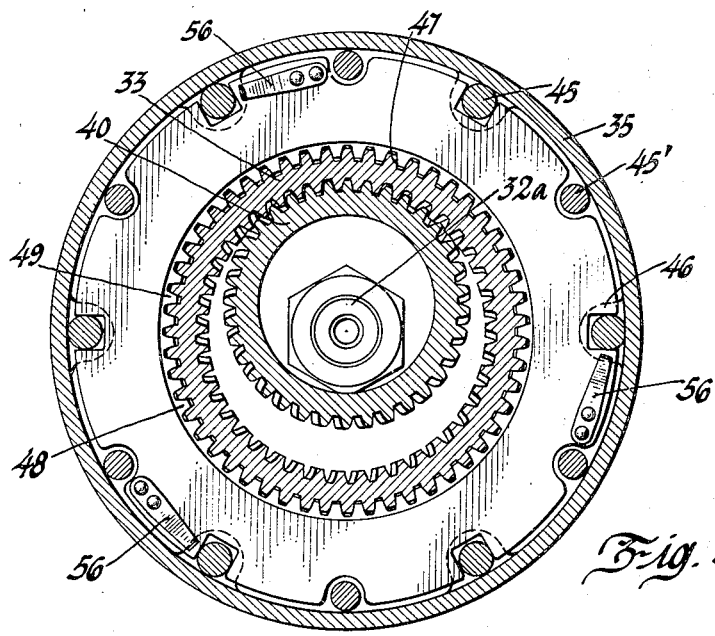
Figure 5 is a transverse vertical section at 5—5 of Figure 4 in the direction of the arrows.

The carrier 35 is fitted with support bolts 45 and 45' on which clutch plates 46 are mounted. A plan view of one of these plates is shown in Figure 5. Gear 33 is externally splined at 47 to accommodate the internal teeth 48 of clutch plates 49 which interleave with clutch plates 46.

Pressure sustaining blocks 50 shown in Figure 3 rest against thrust ring 51, mounted on the carrier 35 by bolts 45'; and presser plate 52 mounted on the right end of the clutch assembly delivers pressure from composite discoidal spring 53 which is likewise mounted on carrier 35, spaced from the backing flange 54, by spacer elements 55, as required by design.

The clutch plates 46 and 49 are normally loaded by spring 53 and unloaded by blocks 50, operated through appropriate movable linkage to be described.

Small finger-type release springs 56 are pinned to clutch plates 46, to assist in prevention of drag when the clutch assembly is disengaged. This detail is shown in Figure 5. A partial view of one of the clutch plates 49 is shown in Figure 5.

The gears 31, 33, 40, 41 are helically cut for quiet running as indicated in Figure 4. The first meshing pair 31—41 are cut of one hand, in the showing, right-handed; and the second meshing pair 33—40 are cut of opposite hand, in the showing, left-handed. This terminology describes the common screw thread and nut which advances with clockwise rotation as "right-handed." This arrangement provides an unique means for providing equalized thrust tendencies, from both input and output torque and this constitutes an important disclosure in that to my knowledge prior inventors have not shown helical meshing gears paired in opposite hand and included in a rotatable eccentric assembly wherein helical gear thrust components tend to cancel out, or to be retained within the body of the gearing, and rotatable casing.

Examination of the force characteristics will make this point clear. As I have disclosed the principle, the thrust between gears 31—41 when the input shaft 5 is driving, is exerted first on the primary gear 31 toward the right where it is taken by bearings 37 for initial reaction. The consequent reaction on secondary or intermediate gear 41 is exerted in the opposite direction, or to the left in the Figure 21 drawing.

Assuming the carrier 35 to be held by brake 42, and drive being transmitted through the gears, gears 40 and 33 are likewise exerting thrust. Since gear 40 is driving, the result of the helical mesh is to exert a thrust tending to move gear 40 to the left and gear 33 to the right. The latter is supported against end thrust by bearing 36 as gear 31 is supported by bearings 37 at the opposite end of the transmission unit.

The net effect of thrust on the gears 40—41 mounted on tubular piece 39 is then a rearward force and the net effect on gears 31—33 is a forward force delivered to bearings 37 and 36 where the carrier 35 tends to support the overall axial tension. The interaction of gears 31—41 in forward drive is for 31 to transmit a forward component to bearing 37 and to the carrier; and a rearward component to the spool 39, eccentric bearing 38 and to the carrier 35, in the body of which the forces cancel. Similarly the interaction of gears 33—40 transmits a forward component to bearing 36 and to the carrier; and a rearward component to the spool 39, eccentric bearing 38 and to the body of the carrier 35.

The transmission of drive from the clutch shaft 3 through the reversing gear unit so as to drive shaft 5 reversely will also create the same thrust effects in driving as the forward drive provides in coasting.

The gear 31 is prevented from axial motion by bearing 37 and gear 33 by bearing 36. The gear and splined tube assembly 39—40—41 is prevented from axial motion by eccentric bearing 38, and the carrier 35 is supported longitudinally by bearings 36—37. It will be noted that the longitudinal thrust forces are held within the carrier and the gear assembly so that no warping tendency is transmitted to the webs of the casing 1, which might distort and cause misalignment of the running shafts, or other transmission parts. Further, the thrust tending to rock the tubular piece 39 and its gears 40—41 is subject to a nullifying or cancelling action.

The lubrication of the automatic unit is from three principal sources, all of which are pressure feed and likewise by additional dip. The tubular piece 39 receives oil pump pressure through duct 113, and the longitudinal drilled main 57 in shaft 32a, which delivers it to the space between gears 31—41. Drain-out from between these gear teeth passes back to sump through space 59 from where some oil flows through holes in the web of casing 1 to space 30.

Similarly oil from the main passage 57 flows into the space between gears 33—40 where the pressure is delivered through channels 60 between the gear teeth to eccentric bearing 38 and clutch spline grooves 47. Oil from the same space flows to bearing 36 through opening 61, which also communicates with spline grooves 47. Louvres 62 cut in the external portion of the carrier permit release of pressure and expedite circulation of oil through the clutch plate assembly which is therefore plentifully supplied at all times.

Bearing 37 receives oil from the space between the gears 31—41 and a portion of its flow passes through to bearing 16.

*The manual unit*

Figure 7:
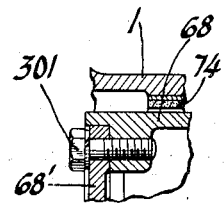
Figure 7 is a section detail on the line 7—7 of Figure 6.

The third gear unit, to be hereinafter called the manual unit, to distinguish it from the other two units previously described, is a planet gear transmission whose input sun gear 63 is affixed to or integral with shaft 32a which delivers output power from the automatic unit. The final power output shaft 64 supported in bearing 86 in the web of the casing 1, has affixed to it concentric sun gear 65. Freely revoluble on bearings 66 and 67 planet carrier 68 supports hollow planet shaft assemblies 69 in bearings 70. The hollow planet bodies 69 are mounted parallel to shafts 32a and 64 and their centers revolve concentrically with the main shafts. Plate 68' is bolted to carrier 68 at 301 for convenience in assembly and forms therewith the composite carrier (see Fig. 7).

In this transmission unit the compound planet gear bodies are formed as hollow planet shafts and planet gears 71 and 72 are affixed to or integral with the gear bodies. In the present version there are three planet gear groups, but one or more may be used within the limits of the design as is commonly known. Planet gear teeth 72 are constantly meshed with sun gear 63 and planet gear teeth 71 are constantly meshed with sun gear 65.

Braking means for the planet carrier are provided similar to those described preceding in the description of the automatic unit. The reaction end 73 of the wrapping band brake 74 is attached to the casing 1 by the adjustable fitting 75, and the movable end 76 is connected to appropriate linkage to be described. The external surface of the planet carrier forms a smooth drum for the braking means such as described preceding for the carrier element of the automatic unit. For this detail, see Figure 3.

Clutch drum 77 is keyed to shaft 32a and is splined externally to fit the internal teeth of clutch plates 49a such as shown at 49 in Figure 5. Mounted on positioning bolts 82 affixed to the planet carrier 68, clutch plates 46a identical with those shown at 46 in Figure 5 and shown in section in Figure 4, are interleaved with the first named clutch plates 49a. Discoidal spring 53a similar to spring 53 of the automatic unit is mounted on the carrier 68 and presses plate 79 against the clutch plate assembly backed by plate 80. Plate 80 is slotted at 81 to fit bolt 82 slidingly mounted in the carrier 68 so as to transmit pressure from spring 53a to the left end of the rod 82 as shown in Fig. 4. Rods 78 transmit releasing effort to plate 80 and to rods 82. Bolts 78' limit motion of 49b with plate 68' attached to carrier 68, giving a series type of release.

A second clutch drum 83 is keyed to the final output shaft 64 and is likewise splined to accommodate the internal teeth of clutch plates 49b of the type shown in Figure 5. The carrier 68 through bolts 82 supports interleaved plates 46b which are pressed to the right by plate 84 notched to receive pull from rod 82 originating in spring 53a.

Blocks 50a similar to blocks 50 of the automatic unit rest against plate 51a and may receive the load of spring 53a, causing the release of clutch plates 46a—49a and by means of rod 82, also the release of clutch plates 46b—49b, at approximately the same instant.

All the gears in this unit are cut helically. Sun gears 63 and 65 are cut with a left hand helix and planet gears 71 and 72 are cut with a right hand helix, or of opposite hand to that of the suns.

Thrust originating from normal right hand rotation of the input shaft is initially exerted as a load to the right of sun gear 63, and is taken on bearing 34. Conversely, thrust originating from the reaction of sun gear 65 and planet 71 is taken on bearing 86.

The compression thrusts on the gear body 69 tend to equalize endwise, and since the gear diameters are not far from equality, surplus longitudinal thrusts are negligible, the helix angles being proportional to gear diameters.

The oil main 57 feeds pumped oil through two radial ports 87 and 88, the first flooding the teeth of gear 63 and bearing 66 and the second, shaft bearings 89 and 90. Drilled hole 91 on the taper of shaft 64 lubricates bearings 67 and 70 as well as filling the interior space 92 whence it flows through to the other bearing 70. Hole 88' lubricates face of gear 71. Oil from gear 63 and hole 88' flows through holes 93 laterally drilled in the carrier webs to flood the clutch spline teeth of 77 and 83. Addition oil from the main feed pipe is led through holes 94 drilled in the sleeve of the drum 77 to provide for clutch drum 77 which is also drilled at 95 to receive it, for flooding the clutch plates 46a—49a.

Oil from the pump main delivery line 113 is led through a separate pipe 96 of relatively large diameter having a flared end 97 and projecting into the external space adjacent clutch plates 46a—49a, whence copious flooding of the plates is achieved.

Lubricating system

The main supply of transmission lubrication oil is kept in the sump which communicates with all three transmission units. The normal oil level is shown at X—Y in Figure 4, to indicate the proper degree of dip of the various units.

The main drive for the transmission lubricating pump is by means of gear 98 which is fixed to rotate with shaft 32a, so that at all times when the vehicle is in motion, the pump assembly will be operating. The pump gear 98 meshes with gear 99 and drives shaft 100 to which the latter gear 99 is fixed. The shaft 100 is supported by bearings in the pump body 101 which is bolted to the casing 1, or made intergral therewith (Fig. 8).

Pump rotor 102 is keyed to shaft 100 and is slotted at 103 to receive vane 104. The vane sweeps past inlet port 105 and drives oil trapped between the rotor 102, vane 104 and eccentrically recessed pump body 101 toward the outlet port 106. This detail is shown in Figure 20.

The pump body 101 is threaded at 107 to receive the ported cylinder 108 of the overpressure relief valve assembly. The plunger 109 fits loosely inside of the cylinder 108 and is held so as to mask normally the ports 110 cut in the cylinder 108, by pressure of spring 111 clamped to the remote end of cylinder 108, by adjustable fitting 112.

The overpressure relief valve may therefore be adjusted to regulate the maximum pressure delivered by the pump to main outlet 113 and drilled feed lines such as 57.

Screwed or bolted to the intake tube 115 is dirt deflector 114, a bowl-shaped piece resting under the intake tube 115 leading to inlet port 105. This deflector is located at an oblique angle to that of the tube 115, the suction caused by operation of the pump rotor 102 setting up a swirling or whirlpool action. The lip of the tube 115 is aligned in a plane with the lip of the deflector 114, so that dirt particles will tend to centrifuge and spill over the edges 116 of the deflector, keeping the lubrication lines free from foreign abrasive material which might damage the bearing surfaces of the transmission elements.

In the description of the general structure and arrangement, it is assumed that shaft 64 is connected to the final drive of the vehicle through appropriate shafts, joints and differential gearing as required.

The casing 1, described thus far may be made as one piece, integral with the bell housing at the portion nearest the engine and with the flange for a universal joint at the rear. The construction of such casings is optional with the designer, and composite external sheath with bolted-on webs as shown in the drawings, is a preferred form.

The heavy central web 117 bolted to flange 118 by bolts 119 is an important element in the construction in that it supports end bearings 34 for the automatic unit, and indirectly planetary carrier 68 through bearing 66 and shaft 32, as well as the mounting for the pump drive as previously described, and the governor mechanism to be outlined later.

Operating mechanism

In the preceding description of the mechanical assemblies of the transmission units, the casing mounted support 43 carries the pivoted end of brake means 42, and 44 designates the movable end of the brake means. I now refer to Figure 2, which presents a diagrammatic view of the relationships of the operating elements.

Pivotally supported at 44 and connected to brake means 42 is floating differential lever 120. Pivot 121 connects lever 120 and 122 for relative movement in one plane. Link 122 is supported at its other end by pivot 123 which joins it to lever 124 pivoted at 125 to the casing and having a cam-shaped end 126.

Floating lever 120 carries pivot 127 at the end opposite to brake-connected pivot 44. Bellcrank lever 128 is pivoted on the casing 1 at 129 and is attached to lever 120 at pivot 127. Clutch rocker lever 130 is pivoted on the casing at 131 and its cam-shaped upper end 132 (Figure 2) normally bears against the rounded cam end 133 of bellcrank lever 128. The lower end of forked lever 130 is pivoted to clutch throwout blocks 50 at 134, which bear against plate or ring 51, as shown in Figure 3.

The assembly of levers then constitutes a system having three net motion components, the brake means pivot 44, the clutch rocker lever pivot 134 and the movable end 126 of lever 124.

As described preceding, clutch spring 53 exerts normal compression against plate or ring 51, reacting from the flange 54 (Fig. 4). The movable end 126 of lever 124 is moved by fluid pressure as will be described in detail later. The interaction of forces between these three points 44, 126 and 134 constitutes an important and useful arrangement of elements, in that for a given position of lever 124, the restrained relative motions of points 44 and 134 serve to provide a certain and sure means for compelling positive braking action to the exclusion of clutch engagement and conversely positive clutching action to the exclusion of brake application, with a minimum overlap.

A further advantage in this arrangement is found in the co-ordination of alternate clutch-brake motion as described, so that changes in the relationships of points 44 and 134 due to wear of the friction faces of clutch discs 46—49 and brake means 42 tend to cancel out variation in the leverage on the primary linkage by such wear. To clarify this point, let us assume that in the new and unworn condition, clutch plate dimensions bring plate 51 and pivot 134 to the position when spring 53 is active, and that movement of lever 130 from M to N in Figure 2, is required to release the clutch plates 46—49; and that after the plates are worn, a further movement of lever 130 from M' to N' is required to free the plates.

Now assume that when new, brake means pivot 44 must move from P to Q to apply the brake means, but when worn, the pivot must move from P' to Q'. It will be seen that the mechanical advantage of lever 124 over corresponding motion of lever 120 and its point 44 is increased as the counterclockwise movement of lever 130 takes up the increment of the distance N—N'. This is true by virtue of the pivot point distances from 121 to 127 and 44 being unequal and the arm 121—44 being the greater, in that the cumulative wear of flat friction clutch discs is equilibrated in design to the wear rate of the circumferential brake surface. A designer given my mechanism, and having the commonly known tabular data for wear coefficients of friction material with the relative operation times during which the clutch and brake elements are to be operative, can reproduce the automatically compensating wear characteristic which is believed to be novel in control devices of this character, in that my design permits approximate even spacing of the control points when the surfaces are new as when worn.

A further advantage in my particular arrangement of elements is the fact that in my preferred design, I achieve a synchronization action from the direction of wrap of brake means 42. While it is true that a friction clutch between the carrier 35 and the casing 1 similar to the clutch assembly 46—49 may be used in place of the brake means 42, I prefer to wind the brake member 42 around the drum surface of the carrier 35 in such a way that no abrupt shocks are created in the mechanism when the clutch 46—49 is released and the brake means 42 actuated.

Assuming the clutch means 46—49 engaged and all rotating elements in the automatic unit moving at unit speed in the right hand direction as is normal in motor car engines of today, the release of the clutch means momentarily breaks the power transmitting connection between input and output shafts 5—32, for the moment ignoring the consequent linked braking action.

Now the engine power being taken away by the release of the clutch 46—49, the output or load shaft 32 connected to the vehicle drive 64 tends to decelerate because of frictional resistance between the vehicle and the air or ground, or both. The engine being relieved of load tends to race ahead faster carrying shafts 3—5 with it. Because of the differential of speed between output and input shafts 5—32a, thus momentarily created and favoring the engine-connected or input shaft 5, the net speed effect on the carrier element 35 is for it to reduce in speed differentially and approach zero speed. The rotational component on the carrier 35 tending to slow it down increases with the degree of differential forward speeds of input and output shafts 5—32a because of the hypocyclic and ratio relationship of the geared elements 31—41—40—33 and the carrier 35.

I wind the brake means 42 with respect to carrier rotation so that the leading or movable end 44 is related to the fixed end 43 by interconnected turns representing a "right hand" screw or helix. The first application of force at point 126 which moves pivot 134 in a direction to declutch 46—49 and moves pivot 44 in a direction to bring the adjacent end of the brake means 42 into contact with the drum surface of carrier 35, occurs at a time as will be described in further detail, when the car operator is accelerating the engine.

In the change-over interval when the clutch is first released, the carrier 35 is still rotating "right-handedly" and the pressing of one end of the brake means 42 on the carrier drum surface only provides a direct braking pressure of minimum degree. As the carrier slows down from the differential speed effect described preceding, as well as from such pressure, the brake means 42 is not yet fully engaged, and relative rotation of input, output and carrier elements is still taking place.

The instant the carrier element slows down to zero speed a change in the operative conditions occurs. The carrier 35 will endeavor to continue its retrograde motion and eventually rotate reversely for a limited period, to the normal direction of shaft rotation. However, a force which, until this interval, has not been effective, now comes into play. The brake means 42 is now drawn down on the drum surface of the carrier 35, by the retrograde rotation of the latter and within a few degrees of rotation the increasing area of contact between the brake means 42 and the drum surface of the carrier has completed the snubbing action and the carrier has definitely stopped.

The net effect of this application of the controlled snubbing band principle is first to synchronize the carrier member to the frame or casing at or near zero speed and eliminate unnecessary slip and consequent wear of the braking means, and second, to set up reaction on the carrier at the instant when input and output shafts are at speeds proportional to the ratio of reduction of the gearing. This provides an important contribution toward relieving disagreeable change-speed shocks to car drivers and passengers as well as toward economy and longer life of the parts of the mechanism.

It is well understood that in the prior art, overrunning clutches of the ball, roller, pawl and coil spring types have been described as located between cage members and a frame for setting up reduction or overdrive reaction means in planetary type gears. In such mechanisms, however, the particular controlled synchronization action of my device is not believed to have been described and the preceeding description is therefore given to point out the features of novelty in my mechanism.

The control mechanism for the manual unit is identical with that of the automatic unit. I show means to take care of the extra requirement for increased power brake actuation as evidenced by the greater mechanical advantage ratio shown in lever 124', between points 126' and 123', and in 120' between points 76 and 127'. In Figure 10 lever 124 is shown in 2 sections fitted over serrated shaft 125 so that I may obtain variable adjustment to suit particular driving, and operating conditions. Since the manual unit is of a gear design in which the relative rotations of the geared elements and carrier provide a carrier deceleration characteristic of different differential speed range from that of the automatic unit, it is useful to provide an optional braking action of greater relative magnitude for a given motion of lever 124' than for lever 124, and it will be seen that pivot 123' is closer to fixed pivot 125' at an angle to line 125'—124' whereas 123—125—124 are in line. As will be described later it is important to provide for augmenting the braking means for auxiliary power capable of locking the brake against an adverse reaction of the carrier drum.

The equivalent elements in the manual unit to those of the automatic unit are indicated by prime marked numbers (') as shown. Except as outlined the functions of these elements are the same as in the automatic unit.

A comparison of Figs. 2 and 10 indicates optional arrangement of link and lever brake clutch actuating mechanism; e. g., 124—122—120—128; 124'—122'—120'—128'.

*Fluid pressure servo system*

In Figure 15 the engine lubrication pump 275 is seen partially in vertical section. The main outlet 276 of the pump is delivered to booster cylinder 277 ported at 278 and 279. Port 279 leads to the main servo feed line 135, and port 278 leads to the ordinary engine bearing pressure feed system. Fitting inside cylinder 277 is piston 280, bleed ported at 281. Spring 282 held by stops 282' prevents piston 280 from uncovering port 279 to the pump feed until sufficient pressure is developed to compress the spring and move the piston to right. This is to assure a definite operating pressure for the servo system even when the engine is idling or running unevenly. Springs of varying strengths may be used to accommodate pressure requirements in different types of installations.

The booster cylinder 277 extends to the right in Figure 15 to form a second chamber 277' having a port 305 connected to pipe 300. Piston 301 and stem 302 form a differential pressure loading means for the first piston 280. Spring 282 bears against retaining stop or seat 282' and stem 302 of piston 301 extends through the cylindrical aperture and may bear against inner stud 303 of piston 280.

Valve 315 shown in section in Figure 17 has 4 ports; the first 306 being connected to feed line 135; and the second 307 leading to serve manifold 136 via pipe 308. The third port is connected by tubing 300 to port 305 of the chamber 277' where pressure delivered through tube 300 may be exerted against piston 301 and load piston 280 against movement to the right. Figures 2 and 18 show piping connections.

In Figure 17 the valve 315 is shown in the inactive position not capable of delivering fluid pressure from the feed line 135 to either pressure delivery lines 300 and 305. When the valve is in this position, it delivers pressure from feed line 135 to the delivery line 308 only. Passage 310 is open to port 311 which relieves pressure from behind 301' and port 305 back to the suction side of engine oil pump 275 or to the crankcase sump. The effect of the valve motion from the position shown in Figure 17 is to increase the net servo line pressure built up by the action of spring 282.

The lever 312, shown schematically in Figures 14, 16 and 17 is connected through rod 316, arm 317 and rod 231 to handlever 232, as shown in Figure 1c. When the hand lever 232 on the steering column is put in the "rev." position of sector 235, the valve lever 312 is moved from the position of Figure 16 so that a high servo line pressure will be available for reverse shift. When the hand lever is moved from the "rev." position to some other position of advance on the sector, the original condition is restored.

Delivery pipe 308 communicates the pressure from the engine oil pump to the inlet servo manifold 136 of the casing 1 as shown in Figure 18. This fluid pressure piping system adjacent the transmission may be cast separately and mounted on the casing by appropriate bolts and flange seats. As shown the casing 1 includes a barrel or cylinder 139 whose axis is parallel to the plane of motion of the levers 124, 124' and extending out to one side of the casing is valve head 137. Seated in the cylinder 139 and movable longitudinally thereof is piston and rod assembly 138, the rod end of which bears against the end 126 of lever 124, as in Figure 10.

A transverse cylindrical passage 137a is drilled in the valve head 137 as a continuous seat for transversely movable valve 140, except for cut away areas 141, 142 and 144, which serve as valve ports. Port 141 is in constant communication with the fluid inlet manifold 136 through drilled hole 145. Port 142 is in constant communication with the head of piston 138, through drilled hole 143, and port 144 is connected to the engine crankcase sump through hole 146 and also through continuation thereof 147, which however, is restricted by self-loaded spring valve 148 affixed at one end to the valve head by screw 149. The valve 140 is a cylinder having approximate diametral fit in passage 137a at either end, and having a cylindrical central portion of smaller diameter and of length equal to three ports widths.

Valve 140 when in the position shown in Figure 18 opens drilled passage 143 to ports 142—137a, 146, 147 and vents the head of piston 138 to the engine oil sump. Pipe 22 in Figure 3 is the oil return line to the crankcase. When valve 140 is in the left-hand position, the servo fluid pressure from manifold 136 and passage 145 is admitted through port 141 to port 142 and passage 143, to the head of piston 138, which moves "downward" in Figures 2 and 10 under the fluid pressure, rocking lever 124, and communicating its force to pivot 134 to load spring 53, as well as to pivot 44 to apply the end of the brake means 42 to the drum surface of the carrier 35.

A second piston 150 in Figure 10, is mounted in cylindrical storage space 151 which communicates through port 152 with oil servo manifold 136 and is stressed by composite spring 153 seated in the base of space 151 for the purpose of positioning piston 150 normally "upward" as shown in Figure 10. The starting up of the car engine immediately builds up pressure from the engine oil pump which is directly geared to the engine power shaft, and this pressure transmitted through pipng 135 and manifold 136 immediately loads piston 150, compressing spring 153 and filling the space 151 above the head of the piston.

The purpose of this mechanism is to provide a means of fluid pressure storage in the auxiliary power system herein described, so that regardless of uneven operation of the engine, or of accidental stalling of the engine, the fluid pressure storage in space 151 will be available for carrying out of the will of the car driver.

The manifold 136 communicates with passage 145' in a second valve head assembly 137' equivalent to 137, the arrangement of elements and functions of the fluid servo system for the manual unit being a duplicate of that for the automatic unit, equivalent elements in the manual unit being indicated by prime (') numbers.

The auxiliary storage device indicated by numbers 150, 151, 152, 153 serves both the manual and the automatic units.

Figure 9:
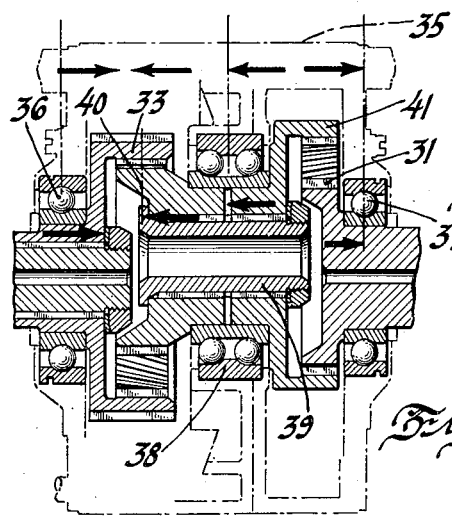
Figure 9 shows the bottom detail of the storage cylinder and piston shown in vertical section in Figure 10.

Figure 9 shows a detail of construction of the accumulator cylinder and piston assembly of Figure 10. Strap 330 is bolted at 329 to the cylinder casing 151, as a retainer for composite spring 153, and to avoid suction lock by leaving the inner chamber of piston 150 open to the sump of the actuating mechanism which is connected by pipe 22 to the sump of the engine crankcase.

To facilitate return of the brake-clutch actuating mechanism to non-servo condition, a supplementary arm 332, attached to shaft 125 provides a movable anchorage and a pivot for spring 331, the other end of which is attached to the casing 139 by adjustable screw 333. Similarly, spring 331' is affixed to the casing at pin 333', its other end hooking into the eye of arm 332' affixed to shaft 125'.

*Automatic controls*

The automatic unit is controlled by a speed responsive governor receiving its speed component from shaft 32a; by the positioning of the engine accelerator pedal 258, and by overcoming or interfering manual controls additional thereto.

Valve 140 is operated by a toggle mechanism pinned to it at 154. An extension 155 of valve head 137 serves as a mount for the fixed pivot 156 on which two toggle arms 157—158 are placed. Toggle arm 157 carries pins 154 and 159, the latter supporting toggle snap spring 160. The other end of spring 160 is hooked around a similar pin 161 at the far end of toggle arm 158. Transversely movable rod 162 is pinned to arm 158 at 163, and is urged by spring 164 to occupy an abutting position with the flat face of extension 155, as shown in Figures 3 and 18. The spring 164 is fastened to rod 162 at pin 163 and to the frame of the casing at 165.

The purpose of spring 160 is to compel valve 140 to occupy definitely one or another of two positions, first, to vent the power cylinder 139 and shut off the fluid pressure; and second, to admit fluid pressure from the manifold 136 to the power cylinder. These functions correspond to direct drive and drive through the gears, respectively, for the automatic unit.

The purpose of spring 164 is to compel the toggle mechanism to occupy a "direct drive" position normally, or, at all times when the external attachments are not transmitting overcoming forces. This normally vents cylinder 138 unless other controls position valve 140 against the action of spring 164.

Lever 166 is pivoted to rod 162 at 167, it is notched at 168 and pivoted to governor rod 170 at 169. Rod 170 is movable laterally and connects with governor bellcrank 172 at 171, as in Figure 18.

Shaft 173 is carried in a web of the casing which serves as a bearing therefor and protrudes into an inner chamber where the toggle and spring elements are located. Affixed to shaft 173 inside of the casing, is lever 174 carrying pin 175. The arc of motion of the pin with respect to the shaft is such that the pin 175 engages notch 168 of lever 166. External to the casing, shaft 173 has affixed to it lever 176 as shown in Figure 19. This lever carries pin 177 and has an extended stop arm 178 which may abut adjustable stop lug 179, fixed to the casing by screw 179'.

Longitudinal motion of governor rod 170 may be transmitted to rod 162 by lever 166 when the governor rod is moving to the right as in Figure 18 fulcruming on pin 175. However, when the governor rod is moving to the left, spring 164 may be active to press notch 168 of lever 166 against the pin 175.

Rotatably mounted on the external end of shaft 173, is hooked lever 180 having stop lug 181 at its upper end and spaced along the shaft so that the hook 182 may engage pin 177 as shown in Figure 19. Accelerator connected rod 183 is joined at 183' to engage pin 177, so that as the accelerator pedal 258 is depressed, it will move toward the left and rotate levers 176, 174 and shaft 173 clockwise. For a given position of the governor rod 170, this action tends to swing lever 166 to the left about 169 as a center, move rod 162 to the left, snap the toggle assembly to the left as in Figure 18 and compel the valve 140 to occupy a position to the left such that the fluid pressure is admitted to power cylinder 139. This of course, cannot take place if point 169 has been moved too far to the left to serve as an effective fulcrum, or obviously, if point 169 is already at some position to the right with respect to pin 175, that the toggle is occupying the left hand position.

The extreme hook end of lever 180 is flattened at 184 to act as an abutment. Three-armed lever 185 is pivoted to the casing at 186. One arm 187 is dimensioned so as to intersect the arc of motion of lever 180, and its end face 188 to contact abutting flat end 184 of lever 180. The upper arm of lever 185 is pivoted to the manual selector rod 190 at 189. Rod 190 has an integral stop 191 which moves in a path to intersect lug 181 of lever 180.

When the stop 191 on rod 190 is moved to strike lug 181, lever 180 is moved clockwise as in Figure 19, the hook 182 catches pin 177, rotating levers 176—174 and shaft 173 clockwise, causing pin 175 to snap the toggle to the left if it is not already there, and compelling the valve 140 to admit fluid pressure to or retain it in the power cylinder of the automatic unit. At wide open throttle when rod 183 is in extreme left position, the manual selector rod 190 is ineffective to move the mechanism for relieving fluid pressure in the power cylinder, due to the abutting of levers 187—182.

The third arm 192 of lever 185 carries pin 193 which moves in an arc about pivot 186. The control elements of the valve 140' which regulates fluid servo pressure for the manual unit are; two armed lever 196, masking lever 198 pinned to 196, pin 202 of rod 162', roller 195 pivoted on extension 194 of governor bellcrank 172, and spring 164'. This spring stresses the toggle mechanism to which it is connected so as to bias the valve 140' normally in the right hand position, which admits the fluid servo pressure from manifold 136 and passage 145' to passage 143' leading to the head of piston 138' shown in Figures 2 and 10. It should be noted that whereas the normal condition of the automatic unit is in direct drive by virtue of spring 164, the normal condition fo the manual unit is in the geared drive because of the action of spring 164' or as thus far described, in these specifications, in reduction gear.

The lever 196 is positioned and pivoted with respect to the three-armed lever 185 so that clockwise movement of the latter will engage masking lever 198 and then lever 196, the arc of curvature of the lever 198 being struck on pivot 186 as a center. For clarity, the assembly of lever 185, rod 190, levers 176 and 182 is shown separately in Figure 19. Element 197 is the pivot on the casing of two arm lever 196 and arm 198. The lever 196 is likewise so dimensioned and spaced from lever 172; its pivot 199 and its arm 194, that in upper positions of point 200, representing the high speed positions of the governor bellcrank 172, the cam end 201 of lever 196 will strike roller 195. This is to prevent motion of the rod 190, lever arm 192 and pin 193 from releasing the valve of the manual unit to low speed ratio position when the governor is operating at above a critical speed.

Shaft 32a located between the transmission units carries gear 98 which drives the transmission lubrication pump through gear 99. Meshed with gear 98 is a second gear 204 fixed to transverse shaft 205 which is supported in bearings 206 in the casing. The flange 207 acts as a support for the bearing and is removably fastened to the casing for inspection and repair. Keyed to shaft 205 is weight support 208, whose arms 209 carry pivot pins 210 on which weights 211 are mounted. Crank arms 212 of weights 211 fit normally between flange 213 of sleeve 214, and support 208. Sleeve 214 is centrally tapped and threaded at its outer end 215 and is fitted with two lipped flange or collar 216. Projecting hood 217 attached to support 208 acts as a retainer for spring 218 and spring 219. Internal extension of hood 217 abuts the two part spring retainer ring 220, which is a retainer for the inner end of spring 219, whose other end abuts the inner end wall of the hood.

When the governor weights attain sufficient speed of rotation to cause travel of sleeve 214 spring 218 is first loaded and then as travel continues, the flange 213 engages ring 220. As shown in Figure 8, between the two parts of ring 220, a third spring 221 tending to hold them apart is located so that a second degree of spring load is achieved at this point. When the two parts of ring 220 are squeezed together, thereafter the spring 219 is alone loaded to the limit of travel or governor maximum speed position.

I have herein described a governor having three distinct ranges of action or zones of response. Double flanged collar 216 is shown in outline in Figure 18 as connected to bellcrank lever 172 at pivot 200. Screw 222 is for disassembly and adjustment, it being desirable to afford springs of various tensions in the means for resisting variably the centrifugal force developed by the governor, as will hereinafter appear. A convenient method of assembly is to bolt the hood 217 to the support of 208 as at 223.

*Manual selector mechanism*

Provision is made for the car operator to overcome the automatic controls by means other than the connection to the accelerator pedal 258, and for shifting speed ratio in the manual unit. As indicated in preceding paragraphs, the selector rod 190 is the means by which such manual effort is expressed on the mechanism. In Figures 10 and 19 the selector rod is shown as pivoted at 189 to arm 185. It is also pivoted at 224 to rod 225 and lever 226.

The steering column of the vehicle is indicated at 227 in Figure 1. At a convenient point, bracket 230 of Figure 1b is attached to the steering column. Swinging from this bracket 230 is pivoted lever 229, pivoted at its outer end 233 to rod 225. Rod 231 is mounted parallel to the steering column and is fixed to the lever 229 so as to convert rotational movement to reciprocating movement of rod 225.

At the upper end of the steering column 227, at a convenient distance for the hand of the car driver, the rod 231 supported by bracket 228 has a hand lever 232 fastened to it and movable over an arc. The hand lever 232 extends radially to a position slightly beyond the periphery of the steering wheel and terminates in a knob 234 shaped to fit the hand. A sector plate 235 is attached to the column bracket 228 and its indicator plate 235' is marked for various manual control positions, "Rev.", "Neut.", "Low", "High" and "3rd", as shown. In the end of the knob is button 236 joined to slotted rod 237 which fits inside of the handlever 232, for a portion of the length of the handlever as in Figure 13. The under portion of the sector plate is notched at five points; corresponding to the markings on the index plate 235. Mounted on pin 241 of the rod 237 is a roller 240, arranged to intersect these notches. The rod 237 is spring loaded by spring 242. The lever 232 can be moved freely from either "3rd" or "rev." position toward the other positions but is opposed by the notches when moved toward "3rd" or "rev." position. The button is returned to inactive position by spring 242 which abuts the inner end of button 236. The roller end may slide along the inner face of the sector plate 235 and since spring 242 is pressing outward, the mechanism does not rattle.

Lever 226, which was described as engaging rods 225 and 190 at pivot 224, is split clamped at 248 to shifter shaft 247 of the reverse gear unit as shown in Figure 10. An extension 249 of the casing 1 shown in Figure 4 acts as a bearing support for the shaft 247. Arm 250 fastened at the inner end of shaft 247, carries roller 251 at its far end.

The casing section of the reverse unit shown in Figures 3 and 10 supports a fixed shifter rail 252 upon which slides fork fitting 253. The roller 251 moves in a path determined by boss 254 and cam face 255. Positions of the roller indicated at 251, 251', 251" indicate forward, neutral and reverse shift respectively. The utilization of the roller and cam motion provides a smooth and positive acting mechanism which is nonreactive in that any reverse thrust from the fork tending to de-mesh the direct drive clutch is exerted against the roller in nearly straight line by the arm 226 and the bearing support of shaft 247.

The shifter fork 253 is conventionally yoke shaped and straddles sliding gear 7 as in Figure 3. The parts of the shifter assembly are lubricated by oil spray and capillary action within the transmission casing. A common type of ball and spring poppet is fixed into the upper side of the fork, and locked in place by a screw 256. The ball of the poppet meets notch 257 in shifter rail 252 when the mechanism is placed in the direct drive position.

The operator's accelerator pedal 258 is mounted conveniently on the floor board of the vehicle as in Figure 1, through fitting pivoted at 259, and is arranged to rock lever 260 by pivoted connection 261. Lever 262 is connected to the engine throttle rod 263 at pivot 262 and to rod 183 of the automatic control unit at pivot 264. The rod 263 is pivoted at 265 to the engine throttle arm 266, which operates the engine throttle element 267, which may be the ordinary butterfly valve, or else an equivalent structure.

The main clutch control is entirely orthodox in that the ordinary main clutch composed of two or more spring loaded discs arranged to transmit the power of the engine to the clutch driven shaft 2, is controlled through proper linkage by the movement of the main clutch pedal 268 adjacent to the foot of the car driver. Forward motion of the pedal separates the discs and relieves the spring load and conversely, backward motion permits the plates to come together and the spring load to be restored for the clutching action.

*Operation*

In describing the functions of the control elements noted preceding, it will be assumed that the main clutch between the engine and the first or reversing transmission unit is normally closed by its springs and that the clutch pedal 268 is retracted, and the sliding gear 7 of the reverse unit is not in mesh with either of gears 8 or 14. The engine is not running and the hand control lever 232 is in the "neut." position on the index plate 235'.

The engine is started by well-understood means (not shown) and the engine oil pump 275 builds up a pressure sufficient to oppose spring 282 and open port 279 to main servo line 135.

The normal position of the valve 140 of the automatic unit is to permit the clutch of that unit to be engaged, and the oil which flows into manifold 136 is not permitted to flow into the cylinder 139. The normal position of the valve 140' of the manual unit as determined by spring 164' is for it to open cylinder 139' to the fluid pressure of manifold 136 and therefore, as soon as fluid pressure is built up by the engine lubricating pump 275, the brake means 74 of the manual unit is applied and the clutches 46a—49a and 46b—49b are disengaged. The normal position of valve 140 is for direct drive in the automatic unit, but initial drive is in reduction in that unit by means that will be described later.

Since there is no power, as yet flowing through the automatic and manual units, there is no rotation of parts and the clutch-brake control mechanisms are simply preset for driving.

The range of movement of the handlever 232 is such that for positions "neut.," "rev.," and "low" on the sector plate 235, the valving controls are not disturbed, and the handlever may be put in any of these positions freely, with normal assistance from the main clutch by the foot of the car driver.

When the handlever is put in low, the automatic unit can operate, but valve 140' of the manual unit is not affected. Since it is biased by spring 164', valve 140' remains in such a position that servo pressure is maintained on the brake actuating element of the manual unit.

As soon as the handlever is put in "high," the valve 140' is snapped over, venting the power cylinder of the manual unit and permitting the coupling clutch of that unit to function. The automatic unit may function as its controls compel, but when the car is stopped, the main clutch must still be used.

The further position, "3rd," of the handlever is for the purpose of setting up a forced downshift in the automatic unit. At this extreme position the stop 191 on 190 rod strikes lever 180, rotating hook 182 and pin 177 clockwise. This forces toggle mechanism 157—158—160 to snap valve 140 of the automatic unit to the left as in Fig. 18, which admits pressure to cylinder 139 and sets the brake 42 of the automatic unit. As a protection against performing this operation at maximum throttle position lever 187 is arranged to swing so as to register with the end of lever 182, the abutting of these levers preventing the completion of movement to the right in Fig. 19 of rod 190, and, of course, the positioning of handlever 232 in the "3rd" position. This lockout action inhibits the downshift of the automatic unit at wide-open throttle position, as a protection for the driving mechanism.

When the car driver wishes to start the motion of the vehicle, the clutch pedal 268 is moved forward by the foot and the hand lever 232 is moved from "neut." to a point opposite mark "low" on the sector plate 235'. This action is transmitted by the described rods and levers to the shifter fork which moves the jaw clutch teeth of gear 7 into mesh with the mating teeth of gear 8. The input shaft 5 of the automatic unit is now ready to rotate with the clutch driven shaft, which is put into drive with the engine by release of the clutch pedal 268.

The car may thereby be set in motion through the retraction of the clutch pedal and drive is transmitted through shaft 3, gears 7—8, shaft 5; through gears 31—33—40—41; to shaft 32a: because of the fact that the governor in collapsed condition at low speed compels low gear drive in the automatic unit, for any advanced throttle pedal position. Since the brake means of the manual unit is normally set and its clutch means normally released, drive is thereupon transmitted through shaft 32, gears 63—72—71—65 to shaft 64. This constitutes in effect, reduction drive through the automatic unit and reduction drive through the manual unit, so that when the car is started by manipulation of the main clutch pedal, it is moved forward at a net transmission reduction speed ratio of the both units.

However in order to accelerate, the natural motion of the car driver's foot moves the accelerator pedal 258 and through the described linkage would work the valve 140, so that an immediate shift to low speed ratio in the automatic unit would be accomplished, in case the governor springs and levers had not already biased the valve to low gear position. The degree of loading by governor springs and the relative adjustment of points 169—171, and pivots 173—169, affect whether or not the governor at rest can compel valve 140 to occupy the left or low speed position in conjunction with the opposing accelerator-pedal-connected levers.

If the governor springs and linkage as shown in Fig. 18 force point 169 to occupy position 169' when the governor is at rest, and if 175' is the normal fully retracted position of pin 175 conditioned by the arrangement of levers connecting with the accelerator pedal motion, the governor at rest compels the fluid pressure valve 140 to occupy the low speed ratio position. This is the preferred arrangement in my mechanism in that it presets the automatic unit for the lowest overall forward driving speed ratio as soon as the engine driven pump delivers sufficient pressure to operate the servo devices.

In the operation of the reverse shift it will be noted that when the hand lever is moved to the "rev." position on the sector, the booster valve shown in Figs. 15 and 17 is moved through previously described connections so as to build up a high pressure in the fluid servo lines. The reason for this is that the normal directional holding force of the wrapping band 74 of the manual unit when in forward drive is changed to a force tending to reject locking of the brake band on the carrier 68. The excess pressure developed in the servo lines is made available during drive in reverse to compensate for the loss of the band wrapping action, to prevent slipping or uncertainty of action. The relative areas of pistons 280 and 301 determine the degree of multiplication of fluid servo effort made available for brake locking in the device.

Additional means to select various types of operation as provided by adjustments shown are within the scope of my invention and constitute commercial methods to correlate the controls to meet special requirements, as outlined preceding.

Assuming that the governor has compelled low gear drive in the automatic unit and that spring 164' has compelled low gear drive in the manual unit, the vehicle will move forward in the lowest available forward driving net speed ratio, which may be termed "low-low."

From this point on for forward drive, further manipulation of the main clutch pedal is unecessary. The retaining of the hand control lever in the "low" position prevents shift of the manual unit to direct drive. Now if the accelerator pedal 258 be depressed the vehicle will move forward with the transmissions driving at the "low-low" ratio. The governor weights move outward and through the described linkages cause rod 170 to move to the left. If the governor reaches an advanced position, it is possible for point 169 to be moved far enough to the left in Fig. 18, to permit spring 164 to snap valve 140 into high ratio position, provided the accelerator be then relaxed to swing pin 175 counterclockwise sufficiently far for this action to take place. This may only occur under depression of the accelerator control and under average circumstances does not occur until the engine speed is increased by such advanced positioning of the pedal, which would be then relaxed so as to permit valve 140 to be snapped to high ratio position by spring 164. The arrangement acts as a protection for both engine and gearing and automatically shifts the automatic unit to high at a given car speed, upon a consequent motion of the accelerator pedal. The "low" sector position of the hand lever provides the car operator with means to drive in lower speed ratios for heavy going such as in sand, mud or snow or on ascending or descending extremely steep grades.

When the car driver shifts the hand lever 232 to "high" position on the sector 235, the connecting linkage moves rod 190 to the right in Fig. 19, and rotates 3-armed lever 187 clockwise. Pin 193 on arm 192 of that lever, shown also in Fig. 18, swings into engagement with the flat end of lever 198 and then engages two-armed lever 196, rocking it clockwise. Pin 202 on rod 162' is picked up by this motion and moves the rod to the left against the action of spring 164'. This motion is transferred to toggle levers 158'—157' by pin 163', and the toggle mechanism snaps to the left. Valve 140' is thereupon forced to the left, venting cylinder 139', releasing brake means 74' and permitting clutch plate assemblies 46a—49a and 46b—49b to engage. Since the manual unit carrier 68 is thereby caused to rotate with the input and output shafts 32a—64 direct drive couple is established in the manual unit.

From this point on, the interaction of governor and accelerator pedal linkages are effective to vary net driving speed ratio by alternate engagement of clutch 46—49 or brake means 42 in the automatic unit.

So that this change may take place within definite car speed zones with relationship to different accelerator pedal position, I have devised the three stage form of governor described preceding, with adjusted strengths of the three springs 218, 219 and 221, to correspond to definite governor speeds, so that the influence of the weights will place collar 216 at corresponding positions towards the right in Fig. 8, as the governor speed rises. In Fig. 18 this movement is "upward."

In the first or low speed zone of action, spring 218 is designed to oppose action of the weights until a shaft speed corresponding to approximately 24 miles per hour is reached. At this point, the flange 213 of the sleeve 214 abuts the left half of the ring 220, and spring 221 between the ring halves begins to be loaded. When it is fully taken up by the movement of the sleeve, the force from the weights is applied directly to spring 219, which takes place at approximately 36 miles per hour. The second degree of action has now been completed and the governor mechanism enters upon the third degree of action.

It should be noted that the interaction between governor weight arms 212 and flange 213 is the resultant of the force developed by the weights 211 in rotating, versus the resisting force of the three springs, which latter are arranged in series-parallel relationship. The initial action of spring compression by the flange 213 is exerted on spring 218 alone, until the flange abuts the near half of telescoping ring 220.

From this point on the flange 213 is working against-two-spring system 219—221 in series and on spring 218 in parallel relationship to the two-spring system. After small spring 221, between the halves of the telscoping ring 220 is taken up, the springs 218 and 219 work in parallel. In the version shown in Fig. 8, the relative strengths or rates of these two springs are dissimilar. My principal objective in this arrangement of opposing springs is to define zones of motion for flange 213 and attached collar 216 which will correspond definitely to speed ranges of the governor shaft and weights, which objective I have achieved by the series-parallel spring system described, which sharpens the critical transition intervals between the three speed ranges of the mechanism. Since normal governor motion follows the speed-square law and has a smooth curve, the superposition of variable rate spring forces clearly provides peak intervals through which the motion of flange 213 proceeds at varying rates. Except for these points the resultant motion of 216 approximates a uniform one over the effective governor ranges.

Under ordinary circumstances the car driver may keep the hand control lever in the "high" position and by manipulation of the main clutch pedal, operate the transmission assembly as a simple two-speed gear, all speed changes taking place in the automatic unit. If rapid acceleration is desired, the hand control lever 232 may be moved back to the "low" position, whereupon the manual unit reduction gear drive will be established by its brake, the coupling clutch releasing.

At this point the operator has the option of maintaining the manual unit in "low" and permitting the automatic unit to shift to its direct drive at a given car speed; or of shifting the hand control lever to "high," and then permitting the automatic unit to complete overall direct drive at a different car speed.

In progression through the gear ratios, the hand control lever may be placed in position "low" for starting up and then immediately moved to "high," since the requirement for continued running in "low-low" is slight except for driving on steep grades.

Shifting down ordinarily from "high" is accomplished either by the accelerator-governor action or the hand control lever 232. If the car speed is allowed to decelerate to approximately 18 miles per hour, the governor will compel a downshift of the automatic unit. If during such deceleration the accelerator pedal 258 be depressed, the downshift will occur at a somewhat higher car speed, the theory of operation being that within certain governor speeds and accelerator pedal positions, such motion of the accelerator pedal constitutes a signal to the mechanism that the car driver wishes to move forward at a speed ratio which yields best acceleration.

The staging of the governor elements, and linkages to the controls for both the manual and the automatic units, determined by design, is such that the governor will shift the automatic unit to direct drive at approximately 20—24 miles per hour, with a normal accelerator pedal position established.

When the lever 196 and hook 201 is met by roller 195 of the governor arm, at about 36 miles per hour, the toggle mechanism of the manual unit can no longer be operated by the handlever 232, to shift to reduction in the manual unit.

At car speeds upward of 55—60 miles per hour, the automatic unit downshift control for "forced 3rd" is prevented from functioning by the action of the stop 191, lever 180 and interaction of the accelerator pedal connection.

At shaft speeds corresponding to 60-65 miles per hour, the governor moves rod 170, lever 166 and notch 168 beyond the motion of arm 174 and pin 175 to the left in Fig. 18, such that direct drive in the automatic transmission unit is compelled and sustained, and if the car operator endeavors to shift the manual unit to low, the action of roller 195 and hook 201 in Fig. 18 prevents such abuse.

The selection of absolute speed ranges for these desired protection means depends upon the purposes of the designer. These principles established in my description are subject, however, to modification without going beyond the scope of my invention.

The hand control lever 232 may shift speed ratio "down" in the manual unit at any time, except at car speeds, upward of 36 miles per hour as noted preceding, when the roller 195 on governor bellcrank lever 172 will intersect hook 201 of lever 196 and hold valve 140' in the direct drive position. This protection expedient is to prevent a car driver from abusing the driving mechanism.

The second interconnection between the mechanism operated by the hand control lever 232 and the shifting control for the manual unit is the arm 187 of three-armed lever 185, and the hook 182 of lever 180. If the accelerator pedal is fully depressed, rod 183 is pushed to the left in Fig. 19, and any motion of 190 toward the right or "forced 3rd" position causes arm 187 to strike hook 184, thus blocking such motion of the hand lever until the accelerator pedal is retracted.

This action is obtained thru the stop 191 on rod 190, stop 181 on lever 180 and pin 177 on lever 176. The handlever button 236, roller 240 with notches 238—239 on sector 235 provide means to inhibit and to permit the motion of the hand lever 232 into the "3rd" position, beyond "high." When the button is depressed and the lever moved to that extreme position, the stops 191 and 181 engage, as rod 190 moves to extreme right hand position in Fig. 19 and lever 180 rotates clockwise, hooking pin and consequently moving levers 176—174 clockwise, the pin 175 being then forced to hold lever 166 and rod 162 to the left against the action of spring 164 regardless of the movements of accelerator pedal 258 or of the governor mechanism.

This control provides the car driver with positive means to utilize the engine as a brake when descending steep gradients, or to eliminate automatic selection for continuous driving in the next reduction speed ratio below direct drive, as when proceeding in rough going, soft roadways, or when ascending long up-grades. Because of the roller relationship to the notch 238 under the selector plate 235, the driver may shift out of the "3rd" position without depressing the button so that a smooth ready return to automatic drive may be made. Further, because of the inclination of the roller and notch surfaces, the hand lever 232 will tend to remain in the "3rd" position, when placed there and not jar loose with the motion of the car.

The roller relationship to the notch 239, is of a somewhat different requirement to the above in that protection for intermeshing gear teeth is desired. So as to remind the driver of a need for clutch pedal assistance in making shifts between neutral and reverse gear in the shift gear unit, I prefer to cut away the inclines of the notch surfaces as shown so that the handlever and roller 240 are held by the notches. This at once reminds the car driver to push button 236. After a few trials even an inexperienced car driver will learn to open the main clutch by means of the clutch pedal 268 when shift to or from reverse or forward is made.

The development of my invention includes additional features of safeguard character. For example, if the spring 282 of the servo pressure system were to break and yield to an engine oil pump pressure insufficient to operate the change-speed controls, the biasing of spring 164' tends to trap oil in cylinder 139' so that the low gear of the manual unit could be in time made available. The biasing of spring 53 of the clutch assembly 46—49 of the automatic unit compels direct drive in that unit, giving an overall speed ratio of an intermediate reduction, so that it would still be possible to drive the vehicle for a considerable distance without harm to the mechanism. Further, as engine speed rises, additional engine oil pump pressure becomes available for ratio shift purposes in the servo mechanism, for operating both transmission units.

If, in below-zero weather, it would be impossible to start the car engine with its own starting mechanism, and towing be required, the clutch springs 53 and 53a would be active to compel direct drive, the most favorable speed ratio for a towing start, and the absence of servo fluid pressure caused by an inoperative engine would not affect the situation. As soon as the engine be started, the servo pressure is available through operation of the oil pump.

Should either of toggle springs 160—160' break, the connected lever systems are positionally related thereto so that any further valve motion is impossible, the loss of spring action being apparent as an undue interval required for either valve 140—140' to go from one position to another, which by failure to accomplish the ratio shift, commands the attention of the car driver to the fact. It will be noted in this connection that the valves 140—141' are of pressure balanced construction and therefore the valve controls are not loaded by fluid pressure from the servo system.

The governor mechanism of Fig. 8, contains three springs 218, 219 and 221, which being completely housed between flange 213 and hood 217, could only change the speed response periods of the governor, if any of them should break; and therefore the driver is protected against loss of car control from that source.

Attention is directed to the self-loaded relief valving utilized in each of the automatic and manual units. Relief port 144 has two outlets for the fluid pressure being drained out of the cylinder 139; the first 146, leads directly to the sump or return line to the engine crankcase, but the second 147 must be opened by movement of the spring valve 148 in order to pass fluid. When control valve 140 is snapped into the relief position, or to the right as in Fig. 18, the first surge of pressure from the cylinder 139 is of sufficient magnitude to raise the spring valve 148 against its own tension and relieve pressure through port 147. Initial pressure therefore is spent rapidly and piston 138 rises to a definite dwell position. Pressure from clutch spring 53 causes the linkage of levers interconnecting points 126, 134 and 46 to follow up the "upward" movement of the piston.

The instant the pressure existing in cylinder 139, drilled passage 143, and at ports 142—144 falls below the spring valve force, the spring valve 148 closes and thereafter as the remainder of the fluid pressure is being released, only port 146 is open. This action is determined in such a way that initial engagement of clutch plates 46—49 takes place during the first rapid phase of fluid pressure relief, and then subsequent slower engagement occurs until they drive completely together. During the second phase only port 146 is active to relieve the pressure.

The arrangement comprises a substantial contribution to smoothness and high efficiency of operation, in that a definitely controlled time interval is introduced during which the elements to be clutched are brought from an initial condition of dissimilar speeds to one of synchronous speeds. The importance of this feature lies in the correlated force of valve spring 148 to clutch plate characteristics and fluid pressure factors. Having an approximate unitary pressure in the fluid servo system at all times, the arrangement of fluid pressure relief control means embodies known factors and relationships such that a high degree of cooperation and exactness in the movements of clutch, brake and fluid pressure connected elements is achieved.

The spring valve 148' in combination with the other elements of the servo system, performs the same function for the clutch-brake control for the manual unit.

In applying the principles taught by my invention one may replace or substitute a number of elements and parts without interfering with the proper functional interrelationships. For example, the transmission lubrication pump instead of being driven from shaft 32a, may be geared to shaft 64, shaft 5, or to either of shafts 2 or 3. I find, however, a definite utility in arranging the drive as I have shown, not only in the convenience of arrangement for space and such considerations, but also in the supporting of load forces in the gearing for the pump and the governor combined. Further, the governor mechanism shown may similarly be driven at the speed of any of the named shafts, but I find special advantage in furnishing its speed index from the shaft between the manual and automatic units, in staging the speed ranges of the governor mechanism, in the design of the parts, and in the interconnection of movable elements joining the governor indexing means with the elements to be controlled.

It will be noted that when the manual unit is in its low gear, that the governor response is conditioned by the speed of the vehicle, but through the reduction gear ratio of the manual unit. On the other hand, when the manual unit is in its direct drive, the governor response is conditioned directly by vehicle speed. Therefore, for given opposing spring loads to the governor weights, the governor mechanism will exert a biasing force on the control valve 140 of the automatic unit sufficient to set up direct drive in that unit at a certain car speed when the manual unit is in low gear; but when the manual unit is in its direct drive, a considerably higher car speed exists when the same biasing force is produced by the weights. We then have an inherent two stage action of the governor on the automatic unit which is conditioned by the existing speed ratio between the governor and the final drive.

For example if we assume the reduction gear ratio of the manual unit to be 2-1; and the critical speed of shaft 32a and governor mechanism to be 18 miles per hour of the vehicle; in order for that speed to be imparted to the shaft 32 when the manual unit is driving in reduction, the output shaft of the manual unit will have a speed commensurate with one-half the speed of shaft 32a, or 9 miles per hour. This principle serves a number of useful purposes. One of them is to prevent too long a driving interval in the "low-low" speed ratio, when both automatic and manual units are in reduction drive. Another useful purpose is to establish a maximum speed range for the governor in which downshift upon deceleration will occur.

It will be noted that in driving the vehicle as I have described, the car driver is aided by this dual range of governor action in two ways. First, in getting away from a standing start, and second, if he has not put the handlever 232 in the "low" position upon coming down to a red traffic light, the governor will make a shift down in the automatic unit at a higher net car speed than the speed at which it had formerly caused "up" shift on the initial start. This serves to preset the automatic shift for a lower gear ahead of any action consequent upon depression of the accelerator pedal. If the traffic condition ahead clears up, the pedal action which otherwise would have served to shift the automatic unit "down," is no longer necessary and the time interval for the shift from direct to reduction in the automatic unit is saved. On the other hand if the car is proceeding in the low gear of the manual unit and direct drive in the automatic unit, the down-shift effect will not occur until the car has come down to a much lower speed, and since the drive is already in reduction, the car driver does not need the extra low gear except at very low vehicle speeds.

The interaction of accelerator-connected pin 175 and governor-connected lever 166 should be carefully noted, for it is here that the combined effects of speed response and operator will are exerted. For a given governor speed position of the notch 168 and pivot point 169 a definite fulcruming force acting clockwise at pin 175 and reacting at pivot 167, is exerted by depression of the accelerator pedal. The resultant positioning of pivot 167 and rod 162 to the left stretches spring 164, and likewise pulls the toggle and valve pivot 154 to the left opening the power cylinder 139 to the fluid pressure of manifold 136. This action set up low gear drive in the automatic unit.

At a given position of pivot 169 and notch 168 with relationship to the shaft center 173 and arm 174 carrying pin 175, the depressing of the accelerator pedal is no longer able to change speed from direct to reduction in the automatic unit. I select the speed at which this occurs by varying the strengths of the governor springs and by adjusting the effective lengths of governor rod 170 or the accelerator link 183, as stated preceding.

Additional modifications may be made of the elements of my invention without affecting the character of the principles which I teach. For example, the hand control lever 232 may be mounted at various points on the vehicle and instead of being supported on the steering column, may be carried by the dash, instrument panel bracing, side panel brackets, front seat support or else by an individual stanchion, the only requirement being that the knob end of the lever be normally positioned convenient to the hand of the car driver.

Furthermore, the final drive need not necessarily be connected beyond shaft 164 to the rear wheels of the vehicle, but may also drive front wheels, an independently sprung bogie or equivalent mechanism, such as in rail cars and train trailer drives.

Other modifications and changes in the parts of the mechanism may be similarly made without avoiding the teachings of this disclosure and those of my application U. S. S. N. 659,752 filed March 6, 1933, in which latter various different invention combinations are manifest.

I claim:

1. In control mechanism for power transmissions, in combination, a transmission unit comprising, an input gear of one diameter, an output gear of a different diameter, an intermediate gear member meshing with both said gears rotatably supported in a carrier, means whereby said carrier is caused to rotate with one of said gears, and gradually engageable means initially fluid pressure actuated and thereafter self-energized to prevent rotation of said carrier simultaneously operative to cause said gears to transmit power, said means becoming thereupon effective at a predetermined speed ratio proportional to the diameters of said input and output gears.

2. In controls for power transmission mechanism, in combination, a variable speed ratio transmission, speed responsive mechanism effective to select certain speed ratios of said transmission, a manually movable speed ratio selecting means, an auxiliary-power operated device to actuate selected speed ratios by both said means and said mechanism and separate speed ratio driving means entirely manually operated by said manual selection means.

3. In combination, a transmission unit comprising output gears of different diameters, an intermediate gear member meshing with both said gears rotatably supported in a carrier, fluid pressure control means for said carrier made gradually effective to cause said gears to drive when the relative speeds of the gears are inversely proportional to their meshing diameters, and alternatively operative to cause said carrier to rotate at the speed of one of said gears.

4. In power transmission gearing, in combination, an input geared element, an output geared element, an intermediate rotatable reaction member intergeared with both said first named elements, means to cause said member to rotate with one of said elements, and fluid pressure actuated means made gradually operative to prevent rotation of the member effective at approximate zero speed of said member.

5. In controls for variable speed transmission units, for automotive vehicles, in combination, variable speed driving mechanism comprising multiple variable speed transmission units connected between the source of power and the load, a speed responsive governor conditioned by vehicle speed operating through variable ratio means, means controlled by said governor operative to select speed ratio in one of said transmission units, and separate means effective to select speed ratio in another of said transmission units conjointly operative to condition said governor operation.

6. In controls for variable speed transmission units for automotive vehicles, in combination, variable speed driving mechanism comprising multiple variable speed transmission units connected in series between the power source and the load, speed responsive ratio selecting means for one of the units, and ratio selecting means for another of said units operative to condition said speed responsive means for selecting action according to the ratio selected by said second named means.

7. In controls for variable speed transmissions for motor vehicles, in combination, a driving shaft, a driven shaft, an automatic variable speed transmission unit, a manually operable variable speed transmission unit, an intermediate shaft connecting said units, a governor driven at the speed of one of the shafts operative to vary the speed ratio of said automatic unit, control means for said manually operable variable speed transmission unit whereby the governor selects automatic speed change at a given vehicle speed at one position of said means, and whereby at a different position of said means, the governor selects automatic speed change at a different vehicle speed.

8. In automatic controls for automotive vehicles, an automatically controlled variable speed ratio transmission unit, a manually controlled variable speed ratio transmission unit, a speed responsive control device operative to select variable speeds of said first named unit, manual control mechanism operative to select variable speeds of said second named unit, and means whereby at a given speed said device is effective to select a speed ratio of the automatic unit at one setting of the manual control mechanism, said means being likewise effective at a different setting of the manual control mechanism, but at a different speed of said device.

9. A composite transmission drive comprising in series, a variable speed transmission unit operative to provide forward, neutral and reverse driving torque, a second variable speed transmission unit operative to provide two inherent driving speed ratios, a third variable speed transmission unit operative to provide two inherent driving speed ratios, shafting between said first and said second named transmission units whereby the output of the first is joined to the input of the second, shafting between said second and said third named transmission units whereby the output of the second is joined to the input of the third, means to change the driving speed ratios of said first named transmission unit, means to change the driving speed ratios of said second named transmission unit, means to change the driving speed ratios of said third named transmission unit, a speed responsive mechanism effective to select the speed ratios of one of said units, and unitary means constantly operative to select any speed ratio of any of said three variable speed transmission units regardless of the existing setting of said speed responsive mechanism.

10. In hypocycloidal gearing, in combination, an input toothed sun gear, an output toothed sun gear, an intermediate element, a toothed gear rotating with said element and meshing with one of said sun gears, a second toothed gear rotating with said element and meshing with the other of said sun gears, and helically-cut teeth on all of said gears arranged so that the teeth of one meshed pair of gears are inclined in one direction of rotation while the teeth of the other meshed pair of gears are inclined in the opposite direction of rotation.

11. An input gear having helical teeth inclined in one direction of rotation, an output gear having helical teeth inclined in the opposite direction of rotation, an intermediate rotating element, a gear rotatably mounted on said element meshing with said input gear and having helical teeth inclined in the same direction as the input gear, a second gear rotatably mounted on said element meshing with said output gear and having helical teeth inclined in the same direction as the output gear, and bearings supporting said input and output gears and said element against endwise thrust.

12. In power transmissions, in combination, an input shaft, an output shaft, a parallel countershaft, a toothed gear rotating with one of said shafts, a toothed gear rotating with said parallel countershaft, a speed synchronizing device consisting of opposing elements each effective to transmit force at the speed of one of the shafts operative to cause said gears to rotate at synchronous speed and porting to deliver lubricant under pressure to the faces of said opposing elements.

13. An input shaft, a concentric output shaft, a geared countershaft member parallel to said shafts, a toothed gear rotating with said member, a slidable toothed gear rotating with one of said shafts and meshable with said gear, gearing operative to transmit drive between the other of said shafts and said member, means to move said slidable gear into mesh with said first named gear, a speed synchronizing device consisting of opposed elements each mounted on one of said shafts, effective to synchronize said gears upon meshing movement of said means and fluid pressure porting arranged to deliver lubricant under pressure to the faces of said opposed elements.

14. In fluid pressure servo systems for automotive control mechanism, in combination, a fluid pressure supply means, a valve pressure chamber connected to said means, a fluid pressure servo motor means, porting in said chamber connected to said motor means, a preloaded valve in said chamber, and an auxiliary device operative to vary the loading of said valve through fluid pressure derived from said chamber.

15. An engine, a speed control pedal for said engine, a coupled hypocycloidal gear unit comprising input and output pinions and an intermeshing geared element, a rotatable carrier for the intermeshing geared element, control means operative to cause said carrier to rotate with one of said pinions, or to remain stationary, a fluid pressure servo device effective to actuate said means, a control mechanism for said device interconnected with said engine speed control pedal, means whereby the said pedal is continuously effective to influence said mechanism over its range of movement affecting the speed of said engine and manual means operative to set aside the action of said control pedal and compel said device to actuate said means.

16. In power transmission mechanism, an input gear element, an output gear element, an intermediate rotatable member, gearing carried by said member helically meshed with said elements, means operative to counterbalance axial thrusts between said elements and said gearing, said means including helical teeth whose respective tangents are proportional to their gear diameters.

17. In automotive vehicles, in combination, an engine connected to a power shaft, three variable speed reduction gear transmission units serially connected between said shafts one of which is entirely automatically operable, control means whereby each unit may drive individually in reduction, additional means effective to cause the input and output shafts of all of said three units to transmit torque at unit speed with said engine and manually operable control devices arranged to coact with said control means while inhibiting the automatic selection of the said automatically operable unit.

18. In speed ratio control devices for power transmission of vehicles, in combination, a prime mover, a load shaft, a speed control for said prime mover, an auxiliary power device driven by said prime mover, interlocking control mechanism linking said control and said device, a supplementary speed responsive element effective to influence the action of said control upon said device and connected with said mechanism, variable speed ratio transmission units connecting said prime mover with said load shaft, said units embodying friction, torque-sustaining means operative to establish different speed ratios within said units; and connecting elements intermediate said device and said means whereby movement of said control is effective to change speed ratio within predetermined speed ranges of said speed responsive element.

19. In power control devices, in combination, an engine, a speed control pedal for said engine, a direct drive friction clutch, means normally biased to engage said clutch, a reduction-drive-supporting brake, means normally biased to release said brake, a linkage joining said means, a fluid pressure motor connected to said linkage, a valve for said motor, a pressure source connected to said valve, valve control mechanism effective in one position to release said clutch and set said brake, and effective in a second position to set said clutch and release said brake; biasing means for said mechanism tending to hold the valve in one position, and connecting means between said mechanism and said pedal effective to overcome said biasing means at various positions of said pedal.

20. In controls for power drives, in combination, a power shaft, a load shaft, a variable speed transmission unit, interposed between said shafts including a multiple-disc direct drive friction clutch, a friction band reduction drive brake and a brake drum; alternately operating mechanism interconnecting movable elements of both said clutch and said brake, a fluid-pressure motor connected to said mechanism, gearing so arranged between said shafts in said unit that shift of said mechanism by said motor to reduction drive position is effective to establish said drive at approximate zero speed of said brake drum and adjusting means associated with said operating mechanism whereby continuous drive occurs during alternate actuation by said motor of said clutch or said brake.

21. Automatic control mechanism for variable speed ratio transmission of power in motor vehicles comprising a driving shaft, a driven shaft, an automatic variable speed transmission unit, a manually operable variable speed transmission unit, an intermediate shaft connecting said units, a governor, driven by one of the shafts operative to vary the speed ratio of the automatic unit, control means for said manually operable unit, wherein the governor selects automatic speed change at a given vehicle speed, and wherein at a different position of the control means, the governor selects automatic speed change at a different vehicle speed.

22. In automatic control mechanism for variable speed gear boxes, a power servo actuated variable speed gearing between an engine and its load, an engine speed control pedal, power servo means to actuate said gearing, energising means controlling said power servo means, including relatively movable elements, one of which is connected to the engine speed control pedal, a second of which is connected to a speed responsive device deriving its control setting from an intermediate shaft rotatable at intermediate speed ratios between the engine and load shafts, so connected to speed ratio actuating mechanism that the driving speed at which change up occurs is less than the speed at which down shift occurs and a third of which is separately effective to inhibit the setting induced by said energising means at the will of the operator, and compel selection of a different forward speed ratio than that selected by said energising means.

23. Automatic control mechanism for variable speed gearboxes as claimed in claim 22 comprising a relay effective to actuate change of speed ratio and arranged to be controlled by said relatively movable mechanical elements.

24. In a power control system comprising a prime mover, a torque controlling device such as an accelerator pedal operable by an operator, a driven shaft adapted to be coupled to the prime mover through a speed change mechanism, ratio selecting means effective upon said mechanism embodying speed responsive means arranged to oppose the effect of the setting of the torque controlling device in automatic selection of the speed ratios of the change speed mechanism, said ratio selecting means being arranged so that at extreme speeds of said speed responsive means the setting of said device is nullified, or has no effect.

25. A variable speed gear controlling mechanism, comprising means providing self-regulation of speed ratio, including a speed responsive governor, a throttle connected mechanism, a servo motor valve, a plurality of servo motors controlled by said valve, and a manual control element wherein for a given range of relative movement of governor and throttle connected elements, the manual control element is effective to completely inhibit the action of the governor and said mechanism at the will of the operator and to compel a selection of and continuous drive in one speed ratio other than the speed ratio otherwise selected by said governor and mechanism.

26. Automatic variable speed transmission mechanism comprising friction clutches in multiple change speed units for connecting a power and a load shaft in high speed ratios, and reduction trains in said multiple change speed units for connecting the shafts in lower speed ratios made effective by friction brakes, a servo device for each unit, relatively movable control elements for each servo device, speed responsive means adapted to coact with the elements of one servo device, manual means adapted to shift the elements of another servo device, and coacting connections between said means whereby for given settings of said manual means, the effect of said speed responsive means is set aside.

27. In automatic control mechanism for variable speed gear boxes according to claim 26, engaging and release mechanism for the clutches and valve-controlled fluid pressure motors operative to actuate the clutch mechanisms wherein orifice porting for the valves provide automatically variable or regulable clutch engaging movement.

28. Automatic control mechanism for variable speed gear boxes according to claim 26 associated with a prime mover, a fluid pressure supply device driven by the prime mover, each servo device having a fluid pressure motor connected to speed ratio shift mechanism actuated thereby, a pressure responsive valve operative to vary the effective pressure delivered from the supply device to the motors, a manual control means and means whereby the manual control means is effective to vary the pressure response of the valve at the will of the operator.

29. Automatic control mechanism for variable speed gearboxes according to claim 26 associated with a variable speed prime mover, a fluid pressure supply device driven by said engine, each servo device having a fluid pressure actuated motor, a piping system joining the supply device to the motors, interconnected automatic valving operable to provide a relatively uniform actuating pressure in the system, wherein a fluid pressure accumulator is constantly effective to dampen fluctuations of pressure in the system originating in the use of said pressure or in variations in the speed of the prime mover.

30. A variable speed transmission mechanism embodying three change speed units serially connected between the power shaft and the load shaft; the primary unit of which is a forward-neutral-reverse change speed gear providing equivalent forward and reverse speeds; the secondary unit of which is an automatically operable change speed gear, the third unit of which is a wholly manually operable change speed gear, and a master control for all of said units adapted to compel low gear drive in said second and third units when positioned for reverse drive in the first of said units.

31. Control mechanism for variable speed gearing of motor vehicles according to claim 22 wherein the movement of the energising means is restrained by rollers moving over inclines between affirming positions to occupy said predetermined positions.

32. In combination with a source of power, a power shaft and an element to be driven, a throttle for said source of power, of power transmitting means including a manually controlled speed change unit, an automatically controlled speed change unit associated with the input side of the manual unit, a connecting shaft joined to both units, and control means for the automatic unit which include a speed responsive device operative at the speed of one of said shafts and in accordance with the positioning of said throttle to control the speed ratio of said automatic unit, and a separate manual connection operative on said manual unit and effective to inhibit completely the action of said device during a predetermined speed range of said device.

33. Change speed mechanism including coaxially arranged input and output shafts, a carrier rotatable about an axis coincident with that of said shafts, braking means operative to lock the carrier against rotation, a driving gear operatively engaged with said shafts to transmit the drive therebetween and eccentrically mounted in said carrier to rotate the same when the locking means is inoperative, and fluid pressure actuated means for initial energising of said braking means whereby reverse rotation of the carrier is thereafter prevented.

34. Change speed mechanism, including input and output shafts, a variable speed driving device connecting said shafts, a rotatable carrier mounting said device in offset relation and receiving the driving thrust, means operatively associated with the carrier to resist its rotation, a pressure responsive device for actuating said means, a source of pressure, a valve controlling communication between said pressure source and pressure responsive device, and means normally operative to bias said valve to an inactive position.

35. In combination, an engine, a variable speed power transmission, a speed selector device associated with said transmission, pressure responsive means for actuating said device, a pressure device driven by said engine, automatic means operative to communicate said pressure with the pressure responsive means when a predetermined relation exists between engine power input and power output of said power transmission.

36. In combination, an engine having a pressure lubricating system including an engine oil pump and an oil sump, a selective speed power transmission mechanism operatively connected with the engine, a pressure responsive device for controlling the speed selection, and a two-way valve movable between two end point positions adapted to communicate said device with the engine oil pump in one position and the oil sump in the other position.

37. In a motor vehicle, in combination, an engine, a throttle for the engine, a driving and a driven shaft, a variable speed transmission between the shafts, friction clutch and brake elements in said transmission, speed ratio control means for said elements, a fluid pressure device for actuating said elements, a governor device for actuating said elements, a governor mechanism operating at the speed of one of the shafts, and means interconnecting said throttle, governor mechanism, and said fluid pressure device whereby at governor speeds above a predetermined speed, the engine decelerating motion of said throttle causes said fluid pressure device to shift said variable speed transmission to a higher speed ratio.

38. In power transmission, in combination, an engine, a throttle for said engine, an automatically operated variable speed transmission including friction torque-sustaining elements driven by the engine, a manually operated variable speed transmission, fluid pressure change speed actuating means for said elements, an intermediate shaft between said transmissions, a governor driven by said shaft, and control means for said first named means connected to said governor and to said engine throttle wherein movement of said throttle automatically selects speed ratio drive by said elements whenever the governor speed is greater than a predetermined speed.

39. In automatic controls for power transmission, in combination, a variable speed power transmission embodying friction drive sustaining clutches and brakes, a power output shaft connected therewith, a transmission speed ratio changing device, fluid pressure means for actuating said device, a control member for said means, mechanism continuously responsive to the speed of said shaft operative to move said control member, manual means operative to move said control member at will at speeds above a predetermined speed of said mechanism, and separate manual means adapted to set aside settings of said member and compel drive through locking of one of said clutches or brakes.

40. In automatic controls for power transmissions, in combination, a variable speed transmission, input and output power shafts for said transmission, a pressure responsive speed changing element, a control device for said element, speed responsive mechanism continuously operative at the speed of one of said shafts to move said device, manual means operative to move said control device at will at increased speeds above a predetermined minimum speed of said mechanism, and auxiliary control means effective to position said device regardless of the action of said means or said mechanism.

41. In motor vehicles, in combination, an engine, an engine throttle, an automatic variable speed transmission unit, a power shaft between said engine and said unit, a manually operable variable speed transmission unit, an intermediate shaft between said first named and said second named variable speed transmission units, a governor operating at the speed of one of the shafts, operator-operable means common to said engine throttle, said governor, and the controls for said first named automatic variable speed transmission unit whereby the latter unit may be controlled for automatic speed ratio selection at selected speeds of said second named manually operable variable speed unit, and additional manual means operative to set aside said automatic selection and compel drive in a selected ratio.

42. In power transmissions, in combination, a variable speed transmission and a control therefor, engine driven fluid pressure servo means for actuating said variable speed transmission control for both increasing and decreasing changes in transmission speed ratio, a control mechanism for said servo, a speed governor operatively connected to said control mechanism, a separate connection manually operable to move said control mechanism at will within a governor speed range greater than a predetermined minimum governor speed, and manual means operative to set aside the action of said governor and said connection, and compel drive in a selected ratio.

43. In power transmissions, in combination, an engine, an engine throttle, a variable speed transmission unit, engine-driven fluid pressure servo means, pressure engaged transmission speed ratio actuating mechanism connected to said means, a speed ratio selector for said device, a connection between said selector and said engine throttle whereby predetermined transmission speed ratio selection is controlled by movement of said throttle, and manual means comprising independent ratio selecting controls operative to set aside the action of said selector and said connection at the will of the operator.

44. In power transmission, in combination, an engine, an engine throttle, a torque multiplying variable speed transmission driven by said engine, a clutch operative to drive at one forward transmission torque ratio, control means moved by said throttle coincidentally operative to disengage said clutch and to compel drive at a predetermined different forward transmission torque ratio, likewise coincidentally operative to engage said clutch and disengage drive from the said different forward transmission speed ratio, and an overcoming connection movable by independent speed ratio controls operative upon said means to select drive regardless of the action of said throttle upon said means.

45. In power transmission controls, in combination, a power plant, an operator-operative control for said power plant, a variable speed transmission unit driven by said power plant, a shaft driven by said unit, a second variable speed transmission unit driven by said shaft, a governor driven by said shaft, means connecting said governor and said operator-operative control automatically effective to jointly select speed ratio of one of said transmission units, and additional means operative to select speed ratio of the other transmission unit, and effective in one position to set aside the automatic action of said first named means.

46. In power transmission controls, in combination, a power plant, an operator-operative control for said power plant, a variable speed transmission unit driven by said power plant, a shaft driven by said unit, a second variable speed transmission unit driven by said shaft, an auxiliary power device effective to actuate speed ratio shift of one of said transmission units, a governor driven by said shaft, means connecting said governor and said operator-operative control automatically effective to jointly control the action of said auxiliary power device, and additional movable means operative to select speed ratio of the other transmission unit, and arranged to set aside the automatic action of said means for given movement.

47. In power transmission controls, in combination, a power plant, an operator-operative pedal control for said power plant, a variable speed transmission unit driven by said power plant, a shaft driven by said unit, a second variable speed transmission unit driven by said shaft, an auxiliary fluid pressure device effective to actuate speed ratio shift of one of said transmission units, a governor driven by said shaft, means connecting said governor and said operator-operative control effective to jointly control the action of said auxiliary fluid pressure device, and an additional control movable to select speed ratio of the other transmission unit, and arranged to set aside the joint action of said pedal and said governor at the will of the operator.

48. In power transmission controls, in combination, a power plant, an operator-operative control for said power plant, a variable speed transmission unit driven by said power plant, a shaft driven by said unit, a second variable speed transmission unit driven by said shaft, a servo device supplied by rotation of said power plant effective to actuate speed ratio shift of at least one of said transmission units, a governor driven by said shaft, means connecting said governor and said operator-operative control effective to control jointly the action of said servo device, and additional movable means operative to select speed ratio of the other transmission unit, and connected to said first named means whereby for given motion the action of said first named means is set aside.

49. In controls for motor cars the combination with a fluid pressure controlled transmission and a fluid pressure supply system automatically sustained, of fluid pressure storage means, engine-driven means for producing fluid pressure, pressure regulating means for determining the pressure of pressure fluid in said storage means operative to sustain a predetermined pressure therein, means moved by the controls for said transmission whereby the pressure of said engine-driven means is controlled by the car operator, fluid pressure distributing means connecting said storage means and said engine-driven means, speed ratio actuating mechanism effective to vary the ratios of said transmission, an operator-operative valve, fluid pressure distributing passages connecting said storage means and said mechanism, and means for controlling the said mechanism by movement of said valve.

50. A prime mover controlled by a speed control pedal arranged to drive a driving shaft, a driven shaft, a rotatable casing, gearing intermediate said shafts and said casing effective to transmit geared drive at one ratio; fluid pressure actuating means for establishing drive through said gearing, fluid pressure actuated means for coupling said shafts together for drive in direct, fluid pressure controlled means responsive to the speed of one of said shafts to select actuation of said means alternately, including a centrifugally movable valve, and a connection between said speed control pedal and said valve whereby said selection of actuation is modified over a limited range of movement of said pedal, said pedal being ineffective above a given centrifugal speed characteristic of said valve to effect speed ratio selection.

51. The combination with a transmission driven from a power means and provided with a speed change mechanism, of a fluid pressure means adapted to actuate said mechanism from a low to a higher speed ratio or from a high to a lower speed ratio, a power driven means to produce the fluid pressure, a governor means to direct the pressure of said power driven means to said actuating fluid pressure means, an operator-operable control for the power means, a connection between said control and said power driven means effective to modify the action of said governor means upon said fluid means, and auxiliary manual control means operative both to limit said modification and to select settings of said speed change mechanism.

52. In power transmission controls, in combination, a power plant, an operator-operative control for said power plant, a variable speed transmission unit driven by said power plant, a shaft driven by said unit, a second variable speed transmission unit driven by said shaft, one of said units embodying an alternate clutch brake ratio changing device, the other of said units embodying a manual shifter mechanism, a final drive assembly driven by said second transmission unit, actuating fluid pressure means for said control and said actuating means whereby predetermined movements of said control establish operation of either clutch or brake, and additional operator-operative control means connected with said mechanism effective to select speed ratio of the other transmission unit.

53. In variable speed transmission controls for prime-mover drives, in combination, an engine, an accelerator pedal for said engine, a main clutch, multiple transmission units driven by the clutch, a speed ratio shift connection to said pedal, a clutch device within said transmission units effective to disconnect torque without disengagement of said main clutch, fluid pressure means acting on said device operative to establish a shift from a higher to a lower speed ratio, speed ratio actuating means acted on by said first named means effective to complete said shift assisted by the reaction on said actuating means, and a governor adapted to interact with said connection at predetermined settings and operative to vary the action of said fluid pressure means.

54. In automatic power control devices, in combination, a governor, a pedal, an automatically selected variable speed ratio transmission unit, an automatic control member for said unit embodying relatively movable fulcra, elements connecting said fulcra with said pedal and governor, a manually selected variable speed transmission driven by said unit, manually operable mechanism effective to select speed ratios of said transmission, and a connection from one of said fulcra operative upon said manually operable mechanism wherein at predetermined high speeds of said governor, the mechanism is inhibited from shifting to a lower speed ratio.

55. In automatic speed-ratio control devices for automotive transmissions, in combination, an accelerator pedal, a speed responsive governor, a speed-ratio selecting valve, a speed-ratio selecting mechanism embodying relatively movable pivoted levers connected to said pedal, to said governor and to said selector valve effective to position said valve according to the positions of the mutually related fulcra of said first named two levers, and a separate lever positionable so as to positively prevent movement of said selector valve for given settings of said separate lever.

56. In automatic speed-ratio control devices for automotive transmissions, in combination, an accelerator pedal, a speed responsive governor, a speed-ratio selecting valve, a speed-ratio selecting mechanism embodying relatively movable pivoted levers connected to said pedal, to said governor and to said selector valve effective to position said valve according to the positions of the mutually related fulcra of said first named two levers, and a separate movable lever normally inactive to effect selection of said mechanism but effective in one position to positively prevent selection by said mechanism.

57. In power gearing, in combination, input and output shafts, two transmission units connected in series therebetween, the first of said units being automatically operable and the second of said units being manually operable, speed ratio control mechanism providing selected ratios in each unit, a manual control for the second of said units movable to different positions, automatic controls for the first of said units effective to change it for increasing or decreasing ratio, and coacting means operative to prevent automatic decrease in ratio shift action when said manual control occupies a given position.

58. In compounded power gearing, in combination, a power shaft, a transmission unit connected thereto embodying forward and reverse driving mechanism, control means for said mechanism, a second variable speed unit driven by the first, speed ratio control means for said second unit, a third variable speed unit driven by the second and connected to a load to be driven, speed ratio control means for said third unit, fluid pressure actuating means for said second and third units, and a master speed ratio selection device connected to said first named control means and to said second and third named control means operative when positioned for reverse drive in said first named unit to enforce drive at low ratio in said second and third units, through operation of said fluid pressure actuating means.

59. Control mechanism for a power servo actuated variable speed gearing between an engine and its load, wherein the servo motor actuating the gearing is energised to effect the gear change by the positioning of relatively movable coacting elements, one of which is connected to the operator-operable engine speed control pedal and continuously movable; a second of which is connected to a speed responsive device deriving rotation from a part driven by said engine and likewise continuously movable; a third of which is separately effective to inhibit the setting induced by said first named elements at the will of the operator and compel selection of and continuous drive in a different forward speed ratio than that normally selected by said first two named elements, and manually operable mechanism effective upon said servo motor normally capable of compelling change of speed ratio to any selected position.

60. Control mechanism for a power servo actuated variable speed gearing between an engine and its load, wherein the servo motor actuating the gearing is energised to effect the gear change by the positioning of relatively movable coacting elements, one of which is connected to the operator-operable engine speed control pedal and continuously movable; a second of which is connected to a speed responsive device deriving rotation from a part driven by said engine and likewise continuously movable; a third of which is separately effective to inhibit the setting induced by said first named elements at the will of the operator and compel selection of and continuous drive in a different forward speed ratio than that normally selected by said first two named elements, and means whereby the speed responsive device develops a ratio control force and the third element develops a ratio control force, said forces being ineffective to oppose the movement of the pedal-connected element.

EARL A. THOMPSON.